(12) United States Patent
Stoner

(10) Patent No.: US 10,936,059 B2
(45) Date of Patent: Mar. 2, 2021

(54) SYSTEMS AND METHODS FOR GAZE TRACKING

(71) Applicant: Cajal Corporation, San Jose, CA (US)

(72) Inventor: Richard Stoner, San Jose, CA (US)

(73) Assignee: Cajal Corporation, San Jose, CA (US)

( * ) Notice: Subject to any disclaimer, the term of this patent is extended or adjusted under 35 U.S.C. 154(b) by 0 days.

(21) Appl. No.: 16/554,487

(22) Filed: Aug. 28, 2019

(65) Prior Publication Data

US 2021/0026445 A1 Jan. 28, 2021

Related U.S. Application Data

(60) Provisional application No. 62/879,163, filed on Jul. 26, 2019.

(51) Int. Cl.
*G06F 3/01* (2006.01)
*G06F 16/435* (2019.01)
(Continued)

(52) U.S. Cl.
CPC .............. *G06F 3/013* (2013.01); *G06F 3/015* (2013.01); *G06F 16/436* (2019.01); *G06F 16/7335* (2019.01); *H04N 13/20* (2018.05)

(58) Field of Classification Search
CPC ............ G02B 2027/014; G02B 27/017; G02B 2027/0187; G02B 2027/0138; G02B 27/0093; G02B 2027/0127; G02B 27/0172; G02B 2027/0178; G02B 30/34; G02B 2027/0134; G02B 27/01; G02B 2027/0123; G02B 2027/0159; G02B 27/0179; G02B 27/4205; G02B 5/1871; G02B 5/1876; G02B 2027/0112; G02B 2027/0118; G06F 3/013; G06F 3/015; G06F 40/30; G06F 2203/011; G06F 3/011; G06F 3/017; G06F 1/28; G06F 1/3206; G06F 1/3212; G06F 1/3234; G06F 1/3296; G06F 40/40;
(Continued)

(56) References Cited

U.S. PATENT DOCUMENTS 6,578,962 B1 6/2003 Amir et al.
9,311,527 B1 4/2016 Yin et al.
(Continued)

OTHER PUBLICATIONS

Baltrušaitis et al. OpenFace: an open source facial behavior analysis toolkit. 2016 IEEE Winter Conference on Applications of Computer Vision (WACV) (Mar. 7-10, 2016). DOI: 10.1109/WACV.2016.7477553. 10 pages.

(Continued)

*Primary Examiner* — Brandi N Thomas
(74) *Attorney, Agent, or Firm* — Wilson Sonsini Goodrich & Rosati

(57) ABSTRACT

The present disclosure provides systems and methods for gaze tracking. The methods for gaze tracking may comprise (a) collecting video data of a subject's face using a device, and (b) processing the video data to track the subject's gaze. The video data may comprise a plurality of images containing depth information. The methods for gaze tracking may track the gaze of the subject without requiring any prior or subsequent calibration of the subject's gaze to a predefined calibration point in space having a known location. The systems for gaze tracking may be configured to implement the methods for gaze tracking.

28 Claims, 18 Drawing Sheets

(51) Int. Cl.
  *H04N 13/20*      (2018.01)
  *G06F 16/732*     (2019.01)
(58) Field of Classification Search
  CPC . G06F 9/46; G06F 1/163; G06F 3/147; G06F 2203/0381; G06F 3/012; G06F 3/0481; G06F 3/04842; G06F 16/284; G06F 19/3475; G06F 1/1626; G06F 3/014; G06F 3/0304; G06F 3/0346; G06F 3/038; G06F 3/04815; G06F 3/0482; G06F 3/167; G06F 16/90
  USPC ........ 351/200, 205–206, 209–211, 221–223, 351/243–246
  See application file for complete search history.

(56) References Cited

U.S. PATENT DOCUMENTS

| | | | |
|---|---|---|---|
| 9,864,430 B2 | 1/2018 | Wu et al. | |
| 10,496,163 B2 | 12/2019 | Siddiqui et al. | |
| 10,496,164 B2 | 12/2019 | Johnson et al. | |
| 2018/0275753 A1* | 9/2018 | Publicover | G06F 3/04812 |

OTHER PUBLICATIONS

Biondi et al. Eye movement behavior identification for Alzheimer's disease diagnosis. Journal of Integrative Neuroscience 17(4):349-354 (Nov. 2018). DOI: 10.31083/j.jin.2018.04.0416.

Deng et al. Monocular Free-head 3D Gaze Tracking with Deep Learning and Geometry Constraints. The IEEE International Conference on Computer Vision (ICCV), pp. 3143-3152 (2017).

Eye Tracking Essentials. Tobi Pro website. Accessed Oct. 14, 2019 at URL: <https://www.tobiipro.com/learn-and-support/learn/eye-tracking-essentials/>. 4 pages.

Huang et al. TabletGaze: Unconstrained Appearance-based Gaze Estimation in Mobile Tablets. Machine Vision and Applications 28(5-6):445-461 (Aug. 2017).

Ishikawa et al. Passive Driver Gaze Tracking with Active Appearance Models. Tech. Report, CMU-RI-TR-04-08, Robotics Institute, Carnegie Mellon University, (Feb. 2004). 12 pages.

Kar et al. A Review and Analysis of Eye-Gaze Estimation Systems, Algorithms and Performance Evaluation Methods in Consumer Platforms. IEEE Access, vol. 5, pp. 16495-16519 (Aug. 7, 2017). DOI: 10.1109/ACCESS.2017.2735633. 25 pages.

Kourtis et al. Digital biomarkers for Alzheimer's disease: the mobile/wearable devices opportunity. npj Digital Medicine 2:9 (2019). Epub Feb. 21, 2019. DOI: https://doi.org/10.1038/s41746-019-0084-2. 9 pages.

Krafka et al. Eye Tracking for Everyone. The IEEE Conference on Computer Vision and Pattern Recognition (CVPR), pp. 2176-2184 (2016).

Papoutsaki et al. The Eye of the Typer: A Benchmark and Analysis of Gaze Behavior during Typing. ETRA '18, Warsaw, Poland (Jun. 14-17, 2018). DOI: https://doi.org/10.1145/3204493.3204552. 9 pages.

Park et al. Learning to Find Eye Region Landmarks for Remote Gaze Estimation in Unconstrained Settings. ETRA '18, Warsaw, Poland (Jun. 14-17, 2018). DOI: https://doi.org/10.1145/3204493.3204545. 10 pages.

Strupczewski et al. Geometric Eye Gaze Tracking. Proceedings of the 11th Joint Conference on Computer Vision, Imaging and Computer Graphics Theory and Applications (VISIGRAPP 2016)—vol. 3: VISAPP, pp. 446-457 (2016). DOI: 10.5220/0005676304440455.

Timm et al. Accurate Eye Centre Localisation by Means of Gradients. Conference Paper (Jan. 2011). 7 pages.

Wood et al. EyeTab: Model-based gaze estimation on unmodified tablet computers. ETRA '14 Proceedings of the Symposium on Eye Tracking Research and Applications. Safety Harbor, Florida (Mar. 26-28, 2014). 4 pages.

Zhou et al. 3D Eye Model-Based Gaze Estimation from a Depth Sensor. 2016 IEEE International Conference on Robotics and Biomimetics (ROBIO) (Dec. 3-7, 2016). DOI: 10.1109/ROBIO.2016.7866350. 6 pages.

* cited by examiner

SYSTEMS AND METHODS FOR GAZE TRACKING

CROSS-REFERENCE

This application claims the benefit of U.S. Provisional Application No. 62/879,163 filed Jul. 26, 2019, which is incorporated herein by reference in its entirety.

BACKGROUND

Gaze tracking technology may be used to enhance user experiences for different electronic devices including desktop computers, laptops, televisions, heads-up displays, and/or mobile devices such as phone or tablets. Such electronic devices may implement one or more aspects of gaze tracking technology to allow users to communicate and/or interact with electronic devices without using physical inputs. Further, gaze tracking technology may allow users to control such electronic devices based on the positions, orientations, and/or movements of the user's eyes.

SUMMARY

Recognized herein are various limitations with gaze tracking systems currently available. Conventional gaze tracking systems may use light sources to illuminate a subject's eyes and may use glint information associated with the subject's eyes to estimate the subject's gaze. However, such conventional systems may require a series of calibration procedures in order to accurately estimate the subject's gaze. Such systems may also require repeated calibration each time the subject wishes to utilize gaze tracking software or applications that can take advantage of the gaze tracking software. The systems and methods disclosed herein may enable gaze tracking without calibration. Further, the systems and methods disclosed herein may accurately monitor one or more characteristics and/or movements of a subject's eyes, including fixation, saccade, smooth pursuit, scanpath, gaze duration, blinking, or changes to pupil diameters, using a combination of machine learning and image-based gaze tracking methods which do not require repeated calibration. In some cases, the systems and methods disclosed herein may implement gaze tracking to diagnose and/or assess a physical, mental, physiological, or psychological condition of a subject.

In an aspect, the present disclosure provides a method for gaze tracking. The method may comprise: (a) collecting video data of a subject's face using a device, wherein the video data comprises a plurality of images containing depth information; and (b) processing the video data to track the subject's gaze, without requiring any prior or subsequent calibration of the subject's gaze to a predefined calibration point in space having a known location.

In some embodiments, the video data may be obtained using a plurality of sensors on the device. The plurality of sensors may comprise an image sensor and a depth sensor.

In some embodiments, the video data may be processed using one or more processors on the device. In some embodiments, the video data may be processed using one or more processors located remote from the device. In some embodiments, the video data may comprise RGB-D video.

In some embodiments, the subject's gaze may be tracked to an accuracy within about 0.1 degrees to about 2.0 degrees and a precision within about 0.5 degrees to about 10 degrees. In some embodiments, the subject's gaze may be tracked substantially in real time as the video data is being collected.

In some embodiments, the device may be a mobile device. In some embodiments, the method may be implemented using the mobile device.

In some embodiments, the subject's gaze may be tracked without requiring or processing glint information. In some embodiments, the gaze information associated with the subject's gaze may be stored for a predetermined period of time. In some embodiments, the gaze information associated with the subject's gaze may be used to update a user interface displayed on the mobile device. In some embodiments, the gaze information associated with the subject's gaze may be provided to another device for additional processing.

In another aspect, the present disclosure provides a system for implementing gaze tracking. The system may comprise a memory for storing video data and a set of instructions for processing the video data; and one or more processors configured to execute the set of instructions for performing operations comprising: (a) collecting the video data of a subject's face using a device, wherein the video data comprises a plurality of images containing depth information; and (b) processing the video data to track the subject's gaze, without requiring any prior or subsequent calibration of the subject's gaze to a predefined calibration point in space having a known location. In some embodiments, the device may be a mobile device.

In another aspect, the present disclosure provides a non-transitory computer readable-medium comprising machine-executable instructions that, upon execution by one or more processors, may implement a method for gaze tracking. The method may comprise: (a) collecting video data of a subject's face using a device, wherein the video data comprises a plurality of images containing depth information; and (b) processing the video data to track the subject's gaze, without requiring any prior or subsequent calibration of the subject's gaze to a predefined calibration point in space having a known location.

In another aspect, the present disclosure provides a method for tracking a subject's gaze. The method may comprise: (a) processing video data to locate an approximate eye position and orientation for each of the subject's left eye and right eye; (b) generating a bounding box for each of the subject's left and right eye based in part on the corresponding approximate eye position and orientation; (c) applying a perspective correction to the bounding boxes and 2-dimensional images of the subject's left and right eye to create modified image representations for each of the subject's left eye and right eye; and (d) extracting a plurality of landmarks from the modified image representations, wherein the plurality of landmarks is used to locate an optimal eye position for each of the subject's left and right eye. The plurality of landmarks may comprise a plurality of points representing a circumference of a pupil of the subject and/or a center of the pupil. In some embodiments, the plurality of landmarks may comprise a plurality of points representing a boundary of the subject's iris and/or a center of the iris. In some cases, the plurality of landmarks may be obtained from a set of static features located anywhere on the surface of an eye ball of the subject. The surface of the eye ball includes the pupil, iris and/or sclera. As an example, the plurality of landmarks may comprise a plurality of points located anywhere on the pupil, iris and/or sclera.

In some embodiments, the video data may be obtained using a plurality of sensors on a device. The plurality of sensors may comprise an image sensor and a depth sensor. In some embodiments, the image sensor and the depth sensor may be implemented using an RGB-D camera on the device. In some embodiments, the image sensor may comprise a front-facing camera and the depth sensor comprising an infrared (IR) sensor.

In some embodiments, the position and pose of the subject's face in the 3-dimensional space may be located using a combination of RGB and RGB-D information in the video data. In some embodiments, a reference frame of the subject's face may be established based on a position and pose of the subject's face in the 3-dimensional space.

In some embodiments, the bounding boxes may be 2-dimensional boxes located in the 3-dimensional space. In some embodiments, the bounding boxes may comprise (1) a left bounding box oriented orthogonal to the approximate eye orientation of the subject's left eye, and (2) a right bounding box oriented orthogonal to the approximate eye orientation of the subject's right eye. In some embodiments, the bounding boxes may be oriented orthogonal to an approximate orientation of the subject's face. In some embodiments, the bounding boxes may be unprojected from the 3-dimensional space and imposed onto the 2-dimensional images of the subject's left and right eye, prior to applying the perspective correction to the bounding boxes.

In some embodiments, the modified image representations may comprise a uniform rectangle image representation for each of the subject's left and right eye.

In some embodiments, the plurality of landmarks may be extracted using a deep learning model. In some embodiments, the deep learning model may comprise a convolutional neural network (CNN).

In some embodiments, the plurality of landmarks may comprise a plurality of point estimates within the 2-dimensional image of each of the subject's left and right eye. In some embodiments, the plurality of point estimates may comprise at least one center point estimate corresponding to a pupil center for each of the subject's left and right eye. In some embodiments, the plurality of point estimates may comprise a plurality of circumferential point estimates surrounding the pupil for each of the subject's left and right eye. In some embodiments, the plurality of point estimates may comprise at least three circumferential point estimates surrounding the pupil for each of the subject's left and right eye. In some embodiments, the plurality of point estimates may comprise at least eight circumferential point estimates surrounding the pupil for each of the subject's left and right eye. In some embodiments, the plurality of point estimates may comprise a plurality of boundary point estimates surrounding the iris for each of the subject's left and right eye. In some embodiments, the plurality of point estimates may comprise at least three boundary point estimates surrounding the iris for each of the subject's left and right eye. In some embodiments, the plurality of point estimates may comprise at least eight boundary point estimates surrounding the iris for each of the subject's left and right eye. In some embodiments, the plurality of landmarks may be distinct from one another.

In some embodiments, the method may further comprise: mapping the plurality of landmarks to the bounding boxes in the 3-dimensional space.

In another aspect, the present disclosure provides a system for implementing gaze tracking. The system may comprise one or more processors; and memory comprising machine-executable instructions that, upon execution by the one or more processors, implements a method for tracking a subject's gaze, the method comprising: (a) locating an approximate eye position and orientation for each of the subject's left eye and right eye; (b) generating bounding boxes for each of the subject's left and right eye based in part on the corresponding approximate eye position and orientation; (c) applying a perspective correction to the bounding boxes and 2-dimensional images of the subject's left and right eye to create a modified image representation for each of the subject's left eye and right eye; and (d) extracting a plurality of landmarks from the modified image representations of the subject's left and right eye, wherein the plurality of landmarks is used to locate an optimal eye position for each of the subject's left and right eye.

In some embodiments, the video data may be obtained using a plurality of sensors on a device. The plurality of sensors may comprise an image sensor and a depth sensor. In some embodiments, the memory and the one or more processors may be located onboard the device. In some embodiments, the device may be a mobile device.

In another aspect, the present disclosure provides a non-transitory computer readable-medium comprising machine-executable instructions that, upon execution by one or more processors, may implement a method for tracking a subject's gaze. The method may comprise: (a) processing video data to locate an approximate eye position and orientation for each of the subject's left eye and right eye; (b) generating a bounding box for each of the subject's left and right eye based in part on the corresponding approximate eye position and orientation; (c) applying a perspective correction to the bounding boxes and 2-dimensional images of the subject's left and right eye to create a modified image representation for each of the subject's left eye and right eye; and (d) extracting a plurality of landmarks from the modified image representations of the subject's left and right eye, wherein the plurality of landmarks is used to locate an optimal eye position for each of the subject's left and right eye.

In another aspect, the present disclosure provides a method for performing autocalibration for gaze tracking. The method may comprise: (a) obtaining a plurality of landmarks from an image representation of at least one of a subject's left eye or right eye; (b) generating a plurality of candidate eye positions, wherein each candidate eye position is represented by an eye ball mesh having a different position and orientation; and (c) selecting an optimal candidate eye position from the plurality of candidate eye positions, based in part on a plurality of intersections between (i) a plurality of projected lines associated with the plurality of landmarks and (ii) the eye ball meshes for the plurality of candidate eye positions.

In some embodiments, the plurality of landmarks may be projected along a normal of a bounding box for each of the subject's left and right eye.

In some embodiments, the position and orientation of each eye ball mesh may be defined relative to an approximate eye reference position for each candidate eye position. In some embodiments, the position of each eye ball mesh may comprise a relative translation to the approximate eye reference position for each candidate eye position. In some embodiments, the orientation of each eye ball mesh may comprise a relative rotation to the approximate eye reference position for each candidate eye position.

In some embodiments, the plurality of projected lines may extend from an origin point in the approximate eye reference position to the plurality of landmarks located in 3-dimensional space. In some embodiments, the plurality of intersections may be distributed on surfaces of the eye ball meshes. In some embodiments, the plurality of intersections may comprise a set of intersections associated with each of the plurality of candidate eye positions.

In some embodiments, the method may further comprise: calculating a distance between a pupil boundary point and a pupil center point, for each set of intersections associated with each candidate eye position, to generate a list of radial distances.

In some embodiments, the method may further comprise: calculating a coefficient of variation for the list of radial distances; and selecting the optimal candidate eye position by comparing the coefficient of variation for the list of radial distances across the plurality of candidate eye positions.

In some embodiments, the steps of (a)-(c) may be performed on a video frame.

In some embodiments, the video frame may be obtained using a plurality of sensors on a device. The plurality of sensors may comprise an image sensor and a depth sensor. In some embodiments, the device may be a mobile device.

In some embodiments, the image sensor and the depth sensor may be implemented using an RGB-D camera on the device. In some embodiments, the image sensor may comprise a front-facing camera and the depth sensor may comprise an infrared (IR) sensor. In some embodiments, the video frame may comprise RGB and RGB-D information.

In some embodiments, the method may further comprise: repeating steps (a)-(c) on each new video frame comprising new information. In some embodiments, the steps (a)-(c) may be repeated substantially in real time as each new video frame is received.

In some embodiments, the autocalibration may be performed without requiring or processing glint information.

In some embodiments, the eye ball mesh may be spherical in shape. In some embodiments, the eye ball mesh may be non-spherical in shape. In some embodiments, the eye ball mesh may be generated in part based on an intersection of two spheres.

In another aspect, the present disclosure provides a system for performing autocalibration for gaze tracking. The system may comprise: one or more processors; and memory comprising machine-executable instructions that, upon execution by the one or more processors, may implement a method for performing autocalibration for gaze tracking. The method may comprise: (a) obtaining a plurality of landmarks from an image representation of at least one of a subject's left or right eye; (b) generating a plurality of candidate eye positions, wherein each candidate eye position is represented by an eye ball mesh having a different position and orientation; and (c) selecting an optimal candidate eye position from the plurality of candidate eye positions, based in part on a plurality of intersections between (1) a plurality of projected lines associated with the plurality of landmarks and (2) the eye ball meshes for the plurality of candidate eye positions.

In some embodiments, the memory and the one or more processors may be located onboard a device. In some embodiments, the device may be a mobile device.

In another aspect, the present disclosure provides a non-transitory computer readable-medium comprising machine-executable instructions that, upon execution by one or more processors, may implement a method for performing autocalibration for gaze tracking. The method may comprise: (a) obtaining a plurality of landmarks from an image representation of at least one of a subject's left or right eye; (b) generating a plurality of candidate eye positions, wherein each candidate eye position is represented by an eye ball mesh having a different position and orientation; and (c) selecting an optimal candidate eye position from the plurality of candidate eye positions, based in part on a plurality of intersections between (1) a plurality of projected lines associated with the plurality of landmarks and (2) the eye ball meshes for the plurality of candidate eye positions.

In another aspect, the present disclosure provides a method for gaze mapping. The method may comprise: (a) selecting an optimal candidate eye position from a plurality of candidate eye positions for each of a subject's left and right eye, wherein each candidate eye position is represented by an eye ball mesh having a different position and orientation; (b) using the optimal candidate eye positions to locate a gaze origin and generate a gaze extent for each of the subject's left and right eye; (c) locating a device screen plane that is indicative of a position of a screen of a device, using in part positional and hardware information associated with the device; and (d) mapping the gaze extent for each of the subject's left and right eye onto the device screen plane to determine the subject's gaze position. In some embodiments, the steps of (a)-(d) may be performed as the subject is looking at the screen of the device.

In some embodiments, the gaze origin may be located at a distance from a pupil center along an eye axis for each of the subject's left and right eye. In some embodiments, the eye axis may be obtained by projecting a vector from a center of the eye to a pupil center along a Z-axis of the optimal candidate eye position. In some embodiments, the gaze origin may be rotated locally about a Y-axis of the eye axis to define a gaze origin orientation. In some embodiments, the gaze extent may be generated by projecting a point along the gaze origin orientation by a predefined distance. In some embodiments, the predefined distance may be about 1 meter.

In some embodiments, a ray may be traced between the gaze origin and the gaze extent for each of the subject's left and right eye, and the gaze extent may be mapped based on intersection points between the rays and the device screen plane. In some embodiments, the intersection points may be located in 3-dimensional space.

In some embodiments, the method may further comprise: converting the intersection points from the 3-dimensional space into relative 2-dimensional coordinates of the device screen plane.

In some embodiments, the method may further comprise: integrating the subject's gaze position over time to determine the subject's focal point with the progression of time.

In some embodiments, the method may further comprise: determining if the subject is looking at a single position on the screen of the device, based on changes in the subject's focal point with the progression of time.

In some embodiments, the method may further comprise: determining if the subject is looking at different positions on the screen of the device, based on changes in the subject's focal point with the progression of time.

In some embodiments, the method may further comprise: determining if the subject is looking at different positions on the screen of the device, based on the subject's smooth pursuit of or fixation on a feature displayed on the screen of the device.

In some embodiments, the method may further comprise: determining a content that is being displayed at the single position or at the different positions on the screen of the device; and evaluating the subject's interest level in the displayed content based on an amount of time that the subject spends looking the content.

In some embodiments, the method may further comprise: determining a content that is being displayed at the single position or at the different positions on the screen of the device; and evaluating the subject's interest level in the displayed content based on a pupil diameter of the subject.

In some embodiments, the method may further comprise: determining an ocular characteristic of the subject, wherein the ocular characteristic comprises at least one of a fixation, a saccade, a smooth pursuit, a scanpath, a gaze duration, a blinking rate, a variation in pupil diameter over time, a degree of bilateral convergence, and/or a vestibulo-ocular reflex. In some embodiments, the ocular characteristic may be derived in part based on a relative position, a relative orientation, or a relative movement of at least one of the subject's left eye or right eye.

In some embodiments, the device may be a mobile device. In some embodiments, the screen may be operably coupled to the mobile device. In some embodiments, the screen may be provided as a separate peripheral component configured to be releasably and operably coupled to the mobile device.

In another aspect, the present disclosure provides a system for performing gaze mapping. The system may comprise: one or more processors; and memory comprising machine-executable instructions that, upon execution by the one or more processors, may implement a method for performing gaze mapping. The method may comprise: (a) selecting an optimal candidate eye position from a plurality of candidate eye positions for each of the subject's left and right eye, wherein each candidate eye position is represented by an eye ball mesh having a different position and orientation; (b) using the optimal candidate eye positions to locate a gaze origin and generate a gaze extent for each of the subject's left and right eye; (c) locating a device screen plane that is indicative of a position of the screen of the device, using in part positional and hardware information associated with the device; and (d) mapping the gaze extent for each of the subject's left and right eye onto the device screen plane to determine the subject's gaze position.

In some embodiments, the memory and the one or more processors may be located onboard the device. In some embodiments, the device may be a mobile device.

In another aspect, the present disclosure provides a non-transitory computer readable-medium comprising machine-executable instructions that, upon execution by one or more processors, may implement a method for performing gaze mapping. The method may comprise: (a) selecting an optimal candidate eye position from a plurality of candidate eye positions for each of a subject's left and right eye, wherein each candidate eye position is represented by an eye ball mesh having a different position and orientation; (b) using the optimal candidate eye positions to locate a gaze origin and generate a gaze extent for each of the subject's left and right eye; (c) locating a device screen plane that is indicative of a position of a screen of a device, using in part positional and hardware information associated with the device; and (d) mapping the gaze extent for each of the subject's left and right eye onto the device screen plane to determine the subject's gaze position.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

Gaze tracking may be used to track a position, an orientation, and/or a movement of a subject's gaze. A subject may be a human or an animal. A gaze of a subject may correspond to a direction and/or a location in space that the subject is looking. In some cases, gaze tracking may involve tracking changes or variations in a position, orientation, and/or movement of the subject's gaze. In an example, gaze tracking may involve monitoring and tracking one or more characteristics or movements of a subject's eyes, including fixation, saccade, smooth pursuit, scanpath, gaze duration, blinking, variations in pupil diameter over time, bilateral convergence, and/or vestibulo-ocular reflexes.

In an aspect, the present disclosure provides a method for gaze tracking. The method may comprise collecting video data of a subject's face using a device, and processing the video data to track the subject's gaze, without requiring any prior or subsequent calibration of the subject's gaze to a predefined calibration point in space having a known location. The device may include one or more of, for example, mobile devices, wearable devices, head-mounted displays (HMDs), smartphones/cellphones, smartwatches, smart glasses, tablets, personal digital assistants (PDAs), laptop or notebook computers, desktop computers, media content players, television sets, video gaming station/system, virtual reality systems, augmented reality systems, cameras, or any electronic device that is configured or capable of collecting video data of a subject's eyes and/or gaze.

Figure 1:
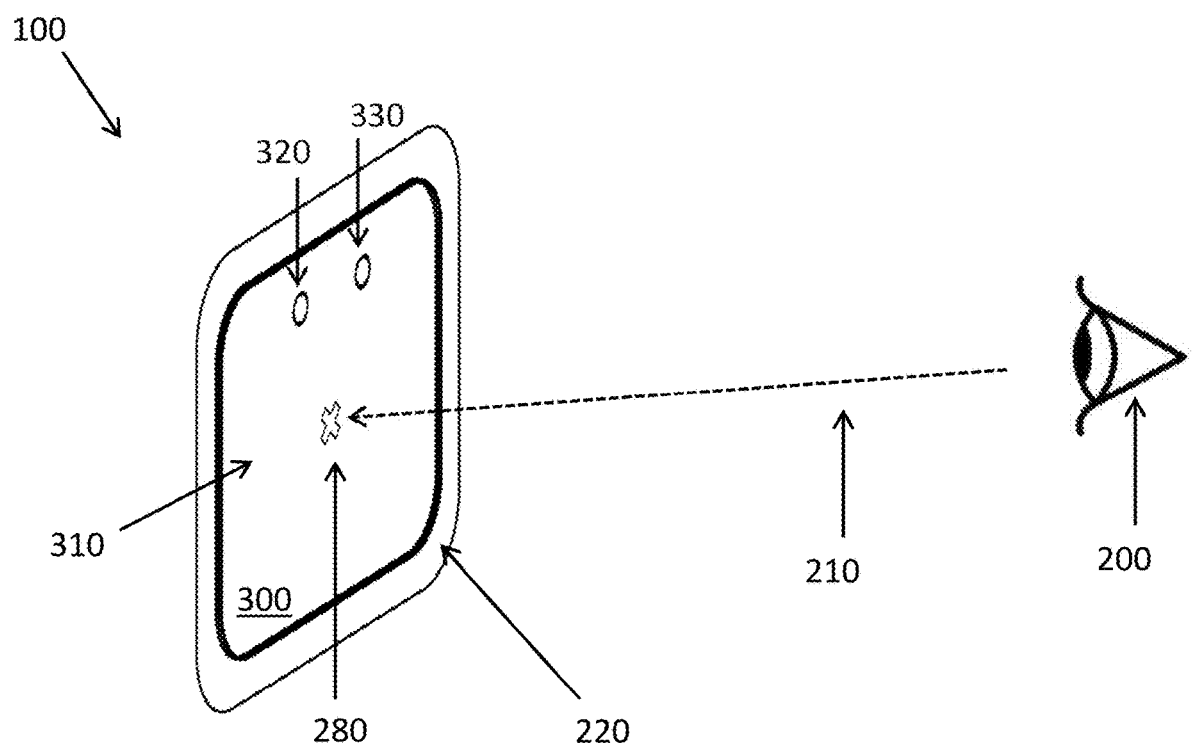
FIG. 1 schematically illustrates a gaze tracking system for tracking a gaze of a subject, in accordance with some embodiments.

FIG. 1 illustrates a gaze tracking system 100 configured to track an eye 200 of a subject and a corresponding gaze 210 of the subject. The gaze 210 of the subject may originate from an eye 200 of the subject and may extend towards a three-dimensional (3D) location in space. The gaze 210 of the subject may be a vector that originates from the eye 200 and intersects a reference plane 220 at a reference point 280. The reference plane 220 may be a plane that corresponds to a position and an orientation of a screen of a device. The reference plane 220 may be a device screen plane. The reference point 280 may be a location in 3D space that lies on the device screen plane 220. The reference point 280 may be a location in 3D space that lies on a screen of the device. The reference point 280 may be a gaze point. The gaze point may be a region of the subject's vision that is focused relative to other regions of the subject's vision. The area that is in focus and in full color may represent the part of the visual field that is covered by the fovea, which comprises a high density of cone cells. The area may have a slightly irregular shape that is about half a millimeter in diameter (about 1-2 visual degrees). Within the rest of the visual field (i.e., the parafoveal and peripheral areas), the image perceived by the subject may become more blurry and thus harder to interpret and discriminate in high detail.

The gaze of the subject may be characterized by a gaze vector. The gaze vector may comprise a gaze direction corresponding to a direction in 3D space that coincides with the gaze of the subject. The gaze vector may be a vector in 3D space that spans from a gaze origin associated with an eye of the subject to a gaze point of the subject. The gaze origin may be a location in an eye of the subject corresponding to a point of intersection between a pupillary axis and a line of sight. The pupillary axis may be a line perpendicular to a cornea that passes through a center of a pupil. The line of sight may be a vector defined by a line passing from the center of the pupil to an object of regard. Alternatively, the gaze origin may be a point of intersection between a pupillary axis and a visual axis. The visual axis may be defined as a line passing from the fovea through a nodal point of the eye. A nodal point of the eye may be a point of rotation and/or a center of rotation of the eye. Any eye-movement made by the subject while scanning an environment may produce a rotation of the visual axis about the nodal point. The systems and methods disclosed herein may be used to estimate and/or compute a gaze vector for at least one of the subject's left eye or right eye. In some cases, the systems and methods disclosed herein may be used to estimate and/or compute a gaze vector for each of the subject's left eye and right eye. Further, the systems and methods disclosed herein may be used to determine an ocular characteristic of the subject in part based on one or more gaze vectors associated with the subject's left eye and/or right eye. The ocular characteristic may include at least one of a fixation, a saccade, a smooth pursuit, a scanpath, a gaze duration, a blinking rate, variations in pupil diameter over time, ocular vergence, a degree of bilateral convergence, and/or a vestibulo-ocular reflex.

Referring to FIG. 1, the gaze tracking system 100 may comprise a gaze tracking device 300. The gaze tracking device 300 may be a device configured to track a direction, and/or a movement of a gaze 210 of the subject. The gaze tracking device 300 may be a device configured to track a position and/or a change of position of the gaze point 280, based on a change of direction or a movement of the gaze 210 of the subject. As shown in FIG. 1, the gaze point 280 may be located on a portion or a surface of the gaze tracking device 300. The device 300 may comprise a screen 310. The gaze point 280 may be located on a portion of the screen 310 of the gaze tracking device 300. In some cases, the gaze point 280 may be a 3D location in space that is not on a portion or a surface of the gaze tracking device 300. For example, the gaze point 280 may be located on another surface, object, and/or device located remote to the gaze tracking device 300.

The gaze tracking device 300 may comprise an image sensor 320 and/or an RGB depth sensor (RGB-D sensor) 330. The RGB-D sensor may or may not be integrated with the image sensor 320. The gaze tracking device 300 may be configured to collect video data of a subject's face using a plurality of sensors operatively coupled to the device. The plurality of sensors may comprise the image sensor 320 and/or the depth sensor 330. The image sensor and the depth sensor may be implemented using an RGB-D camera located on the device. The image sensor 320 may comprise a camera, a camcorder, an imaging sensor, or any device configured to capture and/or process images or videos. In some cases, the image sensor may comprise a front-facing camera. In some cases, the depth sensor may comprise an infrared (IR) sensor. The device 300 may or may not be a mobile device. In some cases, the device 300 may be a mobile device configured to implement any of the systems or methods disclosed herein for gaze tracking. The device may comprise one or more sensors. The one or more sensors may be configured to capture one or more images and/or capture additional information (e.g., depth information) associated with the one or more images. In some cases, the one or more sensors may comprise an image sensor and/or a depth sensor.

The video data captured by the device 300 may comprise a series of images arranged in a temporal manner. The video data may capture one or more features of the subject, such as the subject's head, face, eyes, and/or pupils. In some cases, the video data may capture one or more measurements associated with the one or more features, such as a position of a feature, an orientation of a feature, and/or a distance between two or more features. In other cases, the video data may capture one or more movements of the one or more features. For example, the video data may capture a translation and/or a rotation of the one or more features.

In some cases, the video data may be derived from one or more images and/or one or more videos captured by an image sensor configured to receive and/or process infrared light. In other cases, the video data may be derived from one or more images and/or one or more videos captured by an image sensor configured to receive and/or process X-rays. In some cases, the video data may comprise RGB-D video. The RGB-D video may be generated by combining images and/or videos with depth information associated with the images and/or videos. The video data may or may not be captured substantially in real-time. The video data may be used in part to estimate a direction of the subject's gaze 210 or a gaze point 280 of the subject.

The gaze tracking device 300 may be further configured to process the video data to track the subject's gaze 210, estimate a direction of the subject's gaze 210, or estimate a gaze point 280 of the subject, without requiring any prior or subsequent calibration of the subject's gaze 210 to a predefined calibration point in space having a known location.

Figure 2A:
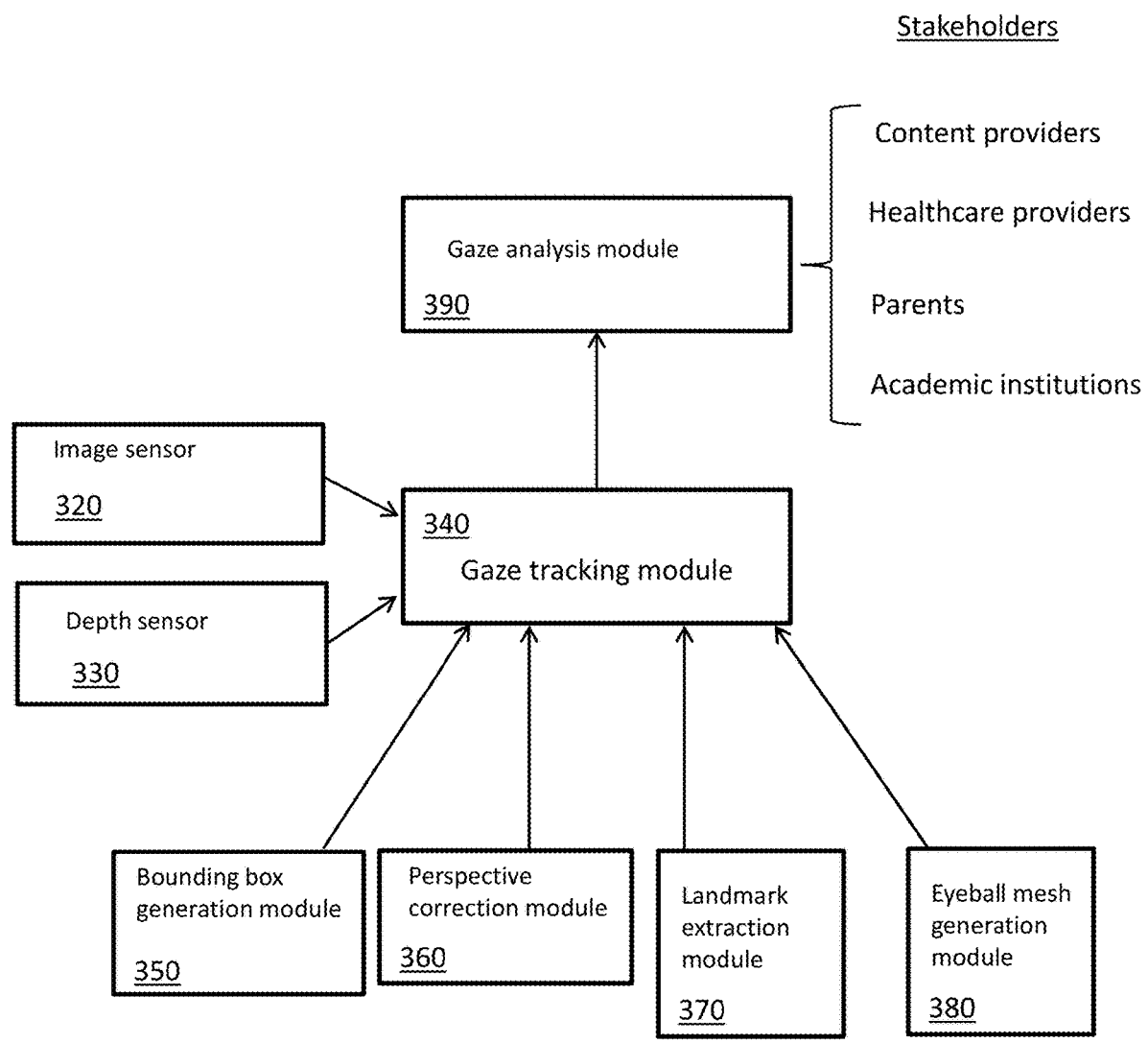
FIGS. 2A and 2B schematically illustrate one or more components of the gaze tracking system, in accordance with some embodiments.
Figure 2B:
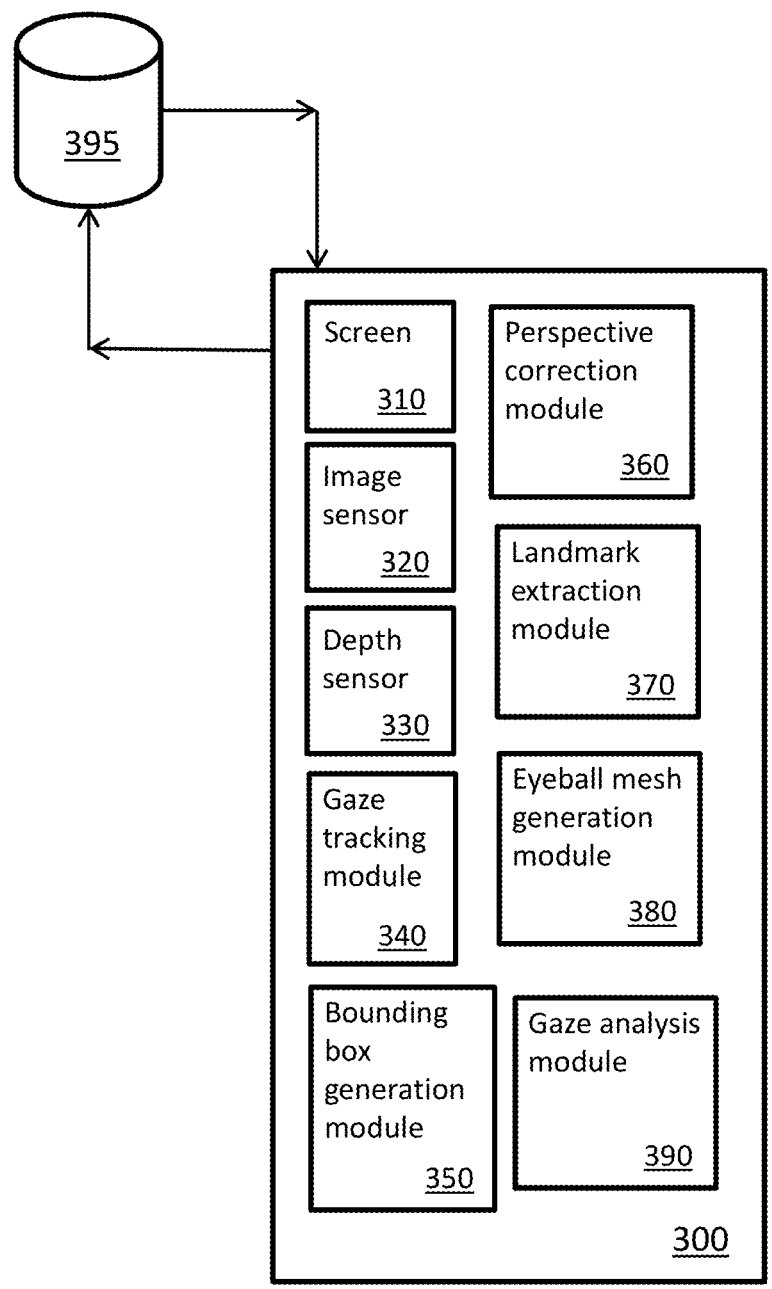

FIGS. 2A-2B illustrate a plurality of components of the gaze tracking device 300. The gaze tracking device 300 may comprise a screen 310, an image sensor 320, a depth sensor 330, and a gaze tracking module 340. The gaze tracking module 340 may be configured to track a gaze of the subject based on one or more inputs provided by the image sensor 320 and/or the depth sensor 330. In some cases, the gaze tracking device 300 may comprise a bounding box generation module 350, a perspective correction module 360, a landmark extraction module 370, and/or an eyeball mesh generation module 380. The bounding box generation module 350 may be configured to generate one or more bounding boxes for each of the subject's left and right eyes. Each bounding box may be a virtual box superimposed on an image comprising the approximate eye position and orientation of the subject. The bounding box may surround a portion of the image corresponding to a left eye or a right eye of the subject. The perspective correction module 360 may be configured to apply a perspective correction to the bounding boxes and 2-dimensional images of the subject's left and/or right eye to create a modified image representation for each of the subject's left eye and right eye. The perspective correction may be an adjustment to flatten the 2D images of the subject's left and/or right eye to compensate for the fact that the image sensor's line of sight may not be perpendicular to the plane on which the bounding boxes lie. The landmark extraction module 370 may be configured to extract a plurality of landmarks from the one or more modified image representations of the subject's left and right eye. The plurality of landmarks may comprise a plurality of points representing a circumference of a pupil of the subject and/or a center of the pupil. In some embodiments, the plurality of landmarks may comprise a plurality of points representing a boundary of the subject's iris and/or a center of the iris. In some cases, the plurality of landmarks may be obtained from a set of static features located anywhere on the surface of an eye ball of the subject. The surface of the eye ball includes the pupil, iris and/or sclera. As an example, the plurality of landmarks may comprise a plurality of points located anywhere on the pupil, iris and/or sclera. The eyeball mesh generation module 380 may be configured to generate one or more eye ball mesh models corresponding to an approximate eye position and/or a candidate eye position for each of the subject's eyes.

As shown in FIG. 2A, the gaze tracking module 340 may be configured to receive one or more inputs provided by the image sensor 320, the depth sensor 330, the bounding box generation module 350, the perspective correction module 360, the landmark extraction module 370, and/or the eyeball mesh generation module 380. The gaze tracking module 340 may be configured to generate gaze information for the subject based on the one or more inputs provided to the gaze tracking module 340. Gaze information may comprise information on a gaze point of the subject or a gaze vector of the subject. The gaze point may represent a point or region in space where the subject is looking at or focused on. The gaze vector may represent a direction in which the subject is looking at or focused on. The gaze point and/or the gaze vector may be estimated in part based on one or more image representations of the subject's left eye and/or right eye.

In some cases, the gaze tracking module 340 may be configured to provide the gaze information to a gaze analysis module 390. The gaze analysis module 390 may or may not be integrated with the gaze tracking system 300. The gaze analysis module 390 may be configured to generate secondary gaze information based on the gaze information generated by the gaze tracking module 340. The secondary gaze information may comprise information on a pattern of movement of a subject's gaze between one or more points or regions within the subject's vision. The secondary gaze information may comprise information on how long a subject's gaze is focused on one or more points or regions of the subject's vision. The secondary gaze information may comprise information on how quickly the subject's gaze moves between one or more points or regions within the subject's vision. The secondary gaze information may comprise information on where on a device screen the subject is looking. The secondary gaze information may comprise information on a pattern of movement of the subject's gaze between one or more points on the device screen. The secondary gaze information may comprise information on how long the subject's gaze is focused on one or more points on the device screen. In some cases, the secondary gaze information may comprise a heat map. The heat map may visually represent static and/or dynamic aggregations of gaze points and fixations to indicate a distribution of the subject's visual attention. In other cases, the secondary gaze information may comprise information on areas of interest that the subject is focused on, fixation sequences of the subject, and/or a time to first fixation (i.e., an amount of time for a subject to look at a specific area of interest based on an initial stimulus).

The gaze analysis module 390 may be configured to generate secondary gaze information based on the gaze information generated by the gaze tracking module 340. In some cases, the gaze analysis module 390 may be configured to provide the secondary gaze information to one or more stakeholders. The one or more stakeholders may include, for example, content providers, healthcare providers, parents, and/or academic institutions.

The secondary gaze information may be used by content providers to adjust and/or customize a user experience of the subject. Content providers may include entities or services that provide information, data, text, audio, images, videos, and/or any other print or digital content to a subject. Content providers may include, for example, Google, YouTube, Facebook, Instagram, Amazon, Twitch, Snapchat, and/or any social media service or multimedia platform that provides print or digital content to users. The secondary gaze information may be used by content providers to assess the subject's interest in different content and to change the type of content provided to the subject to match the subject's interests. In some cases, the secondary gaze information may be used by content providers to adjust the positioning and/or timing of content provided to the subject. In other cases, the secondary gaze information may be used by content providers to adjust the positioning and/or timing of one or more advertisements or pop-ups presented to the subject.

The secondary gaze information may be used by healthcare providers to assess a physical, mental, physiological, or psychological condition of the subject. In some cases, the healthcare providers may use the secondary gaze information to determine whether or not the subject is exhibiting one or more signs indicative of dementia, Alzheimer's disease, Parkinson's disease, schizophrenia, multiple sclerosis, amyotrophic lateral sclerosis, and/or depression. In other cases, the healthcare providers may use the secondary gaze information to diagnose a medical condition of the subject and to develop one or more healthcare protocols to address the medical condition or a symptom of the medical condition. In some cases, the healthcare providers may use the secondary gaze information to assess a cognitive ability of the subject during a medical evaluation, a medical examination, and/or a medical procedure.

In some cases, the gaze information and/or the secondary gaze information may be used to assess, detect, and/or diagnose one or more neurodevelopmental disorders. The one or more neurodevelopmental disorders may include, for example, autism spectrum disorder, Asperger's syndrome, Kanner syndrome, dyslexia, and/or attention deficit hyperactivity disorder (ADHD). In other cases, the gaze information and/or the secondary gaze information may be used to assess, detect, diagnose, and/or grade a concussion, stroke, or non-traumatic brain injury sustained by the subject. Grading may involve a determination of the severity of an injury sustained by the subject, based on a comparison of the gaze information and/or the secondary gaze information against a set of standardized gaze metrics associated with a normal, healthy subject.

The secondary gaze information may be used by parents to monitor and/or track a subject's usage of a device. For example, parents may use the secondary gaze information to determine what type of content the subject is viewing, and how long the subject has been viewing content on the device. In some cases, parents may use the secondary gaze information to limit the type of content available to the subject, or to set one or more time periods during which certain content may be accessible to the subject for viewing. In other cases, parents may use the secondary gaze information to evaluate an attention span of the subject, to detect eye fatigue, and/or to detect a lack of sleep.

The secondary gaze information may be used by academic institutions and/or teachers to assess an academic performance of the subject. For example, teachers may use the secondary gaze information to determine the subject's level of engagement with material presented to the subject. Based on a pattern of movement of the subject's eyes between one or more portions of the material, the teacher may be able to determine the subject's interest in the material. Further, the teacher may use the secondary gaze information to adjust a presentation or a layout of the material to increase the subject's level of engagement with the material. In some cases, teachers may use the secondary gaze information to determine a reading speed of the subject. In other cases, teachers may use the secondary gaze information to determine the subject's ability to identify important subject matter within the material. Alternatively, teachers may use the secondary gaze information to determine how the subject processes the material. For example, teachers may use a pattern of movement of the subject's gaze through the material to determine which words, sentences, and/or paragraphs of the material the subject read or focused on, in chronological order.

As illustrated in FIG. 2B, the gaze tracking device 300 may comprise a screen 310, an image sensor 320, and an RGB-D depth sensor 330. The gaze tracking device 300 may further comprise a gaze tracking module 340, a bounding box generation module 350, a perspective correction module 360, a landmark extraction module 370, and/or an eyeball mesh generation module 380. In some cases, the gaze tracking device 300 may further comprise a gaze analysis module 390.

In some embodiments, the gaze tracking device 300 may comprise a plurality of components. The plurality of components may comprise one or more of the screen 310, the image sensor 320, the RGB-D depth sensor 330, the gaze tracking module 340, the bounding box generation module 350, the perspective correction module 360, the landmark extraction module 370, the eyeball mesh generation module 380, or the gaze analysis module 390. In some cases, one or more components of the plurality of components may be integrated with and/or incorporated into the gaze tracking module 340. In other cases, one or more components of the plurality of components may be provided separately from the gaze tracking module 340. In such cases, the one or more components provided separately from the gaze tracking module 340 may be standalone components.

In some cases, the gaze analysis module 390 may be integrated with and/or incorporated into the gaze tracking module 340. In other cases, the gaze tracking module 340 may be integrated with and/or incorporated into the gaze analysis module 390. In some cases, the gaze tracking module 340 may be configured to perform one or more functions of the gaze analysis module 390. In other cases, the gaze analysis module 390 may be configured to perform one or more functions of the gaze tracking module 340.

The gaze tracking device 300 may be in communication with a server 395. The server 395 may be configured to process and/or store the video data captured by the gaze tracking device 300. In some cases, the server 395 may be configured to process and/or store gaze information derived from the video data. Gaze information may comprise information such as a gaze point, a gaze direction, or a gaze vector of the subject. The gaze information may further comprise information on which images or which portions of the video data were used to derive the gaze point, gaze direction, or gaze vector of the subject. In other cases, the server 395 may be configured to process and/or store secondary gaze information derived from the gaze information. In some cases, the server 395 may be configured to provide processed gaze information or processed secondary gaze information to the gaze tracking device 300 so that the gaze tracking device 300 may track the gaze of the subject and/or refine an estimate of the gaze of the subject.

The device 300 may be configured to process video data of the subject. The device may comprise one or more processors configured to process the video data of the subject. Processing may involve extracting one or more data points from the video data and using the one or more data points to track the subject's gaze 210, estimate a direction of the subject's gaze 210, and/or estimate a gaze point 280 of the subject. The one or more processors may be located on the device. Alternatively, the one or more processors may be located remote from the device. The one or more processors may be operatively coupled to the image sensor and/or the depth sensor of the device. The one or more processors may be configured to receive images and/or videos from the image sensor. The one or more processors may be configured to receive depth information from the depth sensor. The one or more processors may be configured to combine images and/or videos received from the image sensor with depth information received from the depth sensor.

The gaze tracking systems and methods disclosed herein may be used without requiring any prior or subsequent calibration. Calibration may involve using one or more points with known locations in 3D space to adjust an estimated gaze direction and/or gaze point of the subject. The gaze tracking systems and methods disclosed herein may enable accurate gaze tracking in different use applications and/or environments without repeated or additional calibration by the subject. Thus, gaze tracking may be performed quickly and efficiently using the gaze tracking systems and methods disclosed herein.

The gaze tracking methods disclosed herein may be used to track the subject's gaze without requiring glint information. Glint information may comprise information related to a position and/or an orientation of one or more light reflections on a portion of the subject's eye.

The method for gaze tracking may involve tracking a gaze of the subject substantially in real time. In such cases, the gaze of the subject may be tracked while the video data is being collected by the device and/or processed by one or more processors of the device.

The gaze tracking systems and methods disclosed herein may be used to track the subject's gaze to an accuracy of within about 0.1 visual degrees to about 2.0 visual degrees. Accuracy may refer to an average difference between an actual gaze point and an estimated gaze point. Accuracy may be quantified using a root mean square error measurement for one or more measurements taken by the device.

The gaze tracking systems and methods disclosed herein may be used to track the subject's gaze with a precision of within about 0.5 visual degrees to about 10 visual degrees. Precision may refer to an ability of the eye tracker to reliably reproduce measurements for gaze direction and/or gaze point, within a pre-determined threshold. The pre-determined threshold may be determined based on a percentage deviation between one or more measurements taken by the device.

The accuracy and the precision of the systems and methods disclosed herein may allow the gaze tracking device to identify a gaze point and/or a gaze direction of the subject with a resolution sufficient to distinguish between a gaze directed to a first word and a gaze directed to a second word within a sentence displayed on the device screen. In some cases, the resolution may be sufficient to distinguish between a gaze directed to a first sentence and a gaze directed to a second sentence within a paragraph displayed on the device screen. In some cases, the resolution may be sufficient to distinguish between a gaze directed to a first letter and a gaze directed to a second letter within a word displayed on the device screen.

In some cases, the method for gaze tracking may comprise storing gaze information associated with a subject's gaze for a pre-determined period of time. The pre-determined period of time may be 1 minute, 30 minutes, 1 hour, 1 day, 1 week, 1 month, or more. In some cases, the method may comprise providing the gaze information associated with a subject to another device for additional processing. Additional processing may involve adjusting the gaze information based on one or more properties of an imaging sensor (e.g., focal length, aperture size) and/or one or more characteristics of the subject (e.g., a pupil size, a diameter of the eye, a position and/or an orientation of the face of the subject, or a position and/or an orientation of the eyes of the subject). The gaze information may comprise data relating to one or more estimations or calculations of gaze origin, gaze direction, and/or gaze point for each of the subject's eyes. The gaze information may further comprise information on the images used to generate the estimations or calculations, and/or data extracted from the images used to generate the estimations or calculations. In some cases, the gaze information associated with the subject's gaze may be used to update a user interface displayed on the mobile device.

In some cases, the gaze information associated with the subject's gaze and/or the secondary gaze information generated from the gaze information may be provided and/or transmitted to an external device for additional processing. At least a portion of the gaze information and/or the secondary gaze information may be transmitted to the external device in real time (i.e., while the gaze information and/or the secondary gaze information is being generated or updated), or after a pre-determined amount of time has lapsed. As described above, the additional processing may involve adjusting the gaze information and/or the secondary gaze information based on one or more properties of the imaging sensor (e.g., focal length, aperture size) and/or one or more characteristics of the subject (e.g., a pupil size, a diameter of the eye, a position and/or an orientation of the face of the subject, or a position and/or an orientation of the eyes of the subject). In some cases, the external device may be a remote server and/or a second mobile device configured to perform gaze tracking. The external device may be configured to receive the gaze information and/or the secondary gaze information, associate the gaze information and/or the secondary gaze information with a particular user, and store the gaze information and/or the secondary gaze information so that the external device may utilize the gaze information and/or the secondary gaze information to track and monitor the user's gaze at a later time, without further calibration.

The systems and methods disclosed herein may be implemented to perform gaze tracking in part based on one or more gaze vectors associated with at least one of the subject's left eye or right eye. In some cases, the systems and methods disclosed herein may be implemented to perform gaze tracking in part based on one or more gaze vectors associated with each of the subject's left eye and right eye.

In another aspect, the present disclosure provides a system for implementing gaze tracking. The system may comprise a memory for storing video data and a set of instructions for processing the video data. The system may comprise one or more processors configured to execute the set of instructions for performing gaze-tracking operation. The set of instructions may comprise instructions for (a) collecting the video data of a subject's face using a device, and (b) processing the video data to track the subject's gaze, without requiring any prior or subsequent calibration of the subject's gaze to a predefined calibration point in space having a known location. The device may be configured to collect video data comprising a plurality of images containing depth information. In some cases, the device may be a mobile device.

In a different aspect, the present disclosure provides a non-transitory computer readable-medium comprising machine-executable instructions that, upon execution by one or more processors, may implement a method for gaze tracking. The method may comprise: (a) collecting video data of a subject's face using a device, wherein the video data comprises a plurality of images containing depth information; and (b) processing the video data to track the subject's gaze, without requiring any prior or subsequent calibration of the subject's gaze to a predefined calibration point in space having a known location.

Figure 3:
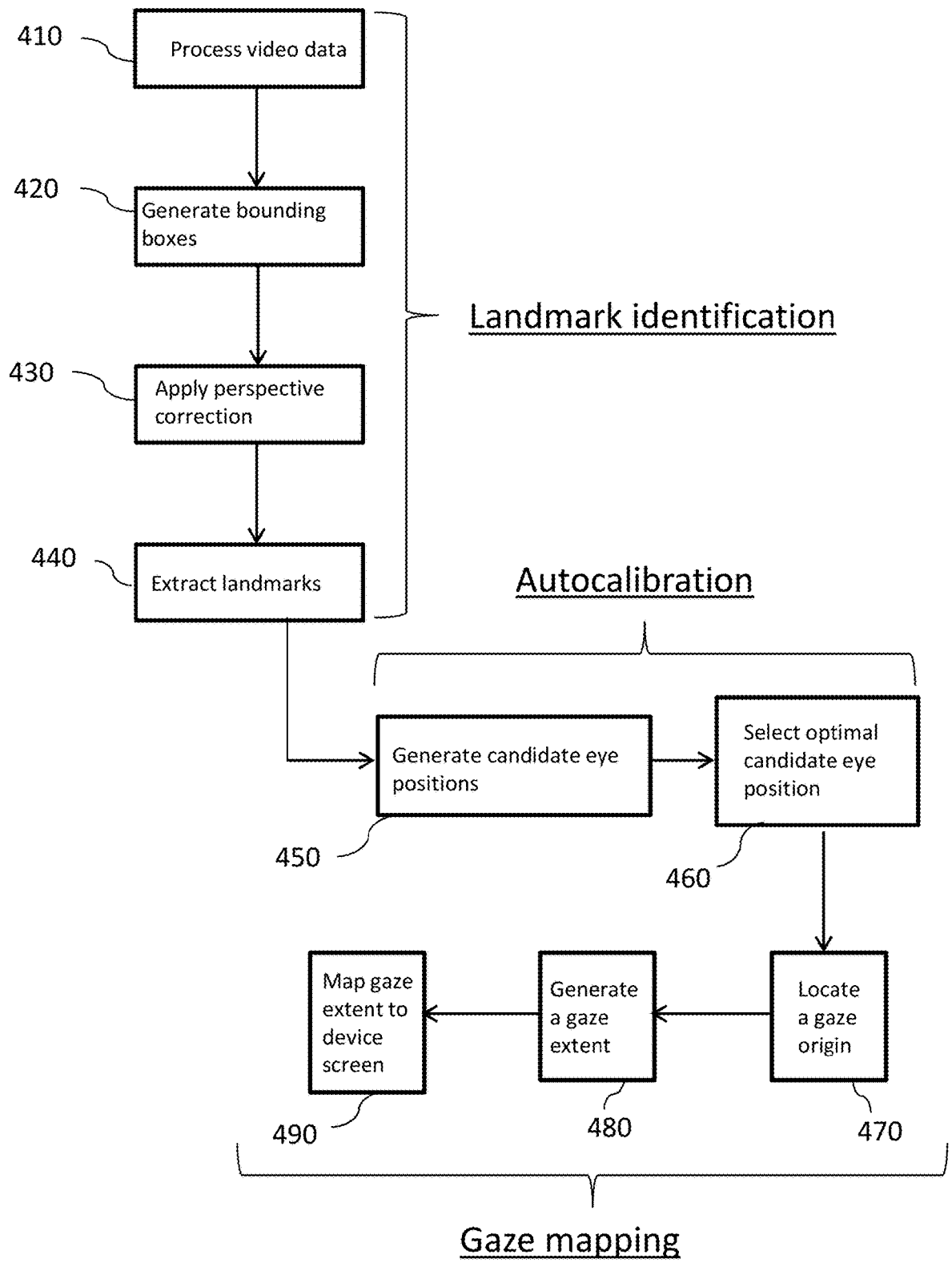
FIG. 3 schematically illustrates a plurality of steps for performing gaze tracking, in accordance with some embodiments.

FIG. 3 illustrates a plurality of steps that may be performed to implement the gaze tracking and/or gaze mapping methods disclosed herein. The plurality of steps may comprise (i) a series of steps for landmark identification, (ii) a series of steps for autocalibration, and (iii) a series of steps for gaze mapping.

The plurality of steps may comprise (i) a series of steps for landmark identification. The series of steps for landmark identification may comprise a first operation 410, a second operation 420, a third operation 430, and a fourth operation 440. In a first operation 410, the method may comprise processing video data captured for each of the subject's left and right eyes. Next, in a second operation 420, the method may comprise generating bounding boxes for each of the subject's left and right eyes. Subsequently, in a third operation 430, the method may comprise applying a perspective correction to each of the bounding boxes generated in the second operation 420 to create modified image representations for each of the subject's left eye and right eye. Next, in a fourth operation 440, the method may comprise extracting a plurality of landmarks from the modified image representations.

The plurality of steps may comprise (ii) a series of steps for autocalibration. The series of steps for autocalibration may comprise a fifth operation 450 and a sixth operation 460. In a fifth operation 450, the method may comprise generating one or more candidate eye positions. The one or more candidate eye positions may be represented by an eye ball mesh model. The one or more candidate eye positions may provide an estimation of a position of the subject's left eye or right eye. Next, in a sixth operation 460, the method may comprise selecting an optimal candidate eye position. The optimal candidate eye position may be selected from a plurality of candidate eye positions based on a comparison of radial variances between each of the plurality of candidate eye positions.

The plurality of steps may comprise (iii) a series of steps for gaze mapping. The series of steps for gaze mapping may comprise a seventh operation 470, an eighth operation 480, and a ninth operation 490. In a seventh operation 470, the method may comprise locating a gaze origin of the subject, for each of the subject's left and right eyes. Next, in an eighth operation 480, the method may comprise generating a gaze extent of the subject, for each of the subject's left and right eyes. Subsequently, in a ninth operation 490, the method may comprise mapping the gaze extent for each of the subject's left and right eyes to a screen of a device that the subject is looking at and/or focused on. Mapping the gaze extent for each of the subject's left and right eyes may involve generating (a) a first ray spanning from the gaze origin of the subject's right eye to the gaze extent of the subject's right eye and (b) a second ray spanning from the gaze origin of the subject's left eye to the gaze extent of the subject's left eye. A combined gaze point corresponding to the gaze point of the subject may be derived from one or more intersection points between the first ray, the second ray, and/or the device screen plane corresponding to a location and orientation of the screen of the device in 3D space.

In another aspect, the current disclosure provides a method for tracking a subject's gaze. The method may comprise capturing video data of the subject using a device, and processing the video data to locate, for each of the subject's left eye and right eye, an approximate eye position and orientation relative to a reference frame of the subject's face in 3-dimensional space. Locating an approximate eye position and orientation may involve extracting and/or computing an estimate of an eye position and orientation from the reference frame of the subject's face. The reference frame of the subject's face may be established based on a position and a pose of the subject's face in 3-dimensional space, a position and a pose of one or more features (e.g., a nose, an ear, a mouth, a cheek, or a facial structure) of the subject's face in 3D space, and/or a combination of positions and poses of one or more features of the subject's face. A pose may refer to an orientation of the face of the subject relative to a reference point, reference line, or reference plane. In some cases, a pose may refer to an orientation of one or more features of the subject's face, relative to a reference point, reference line, or reference plane. The reference frame of the subject's face may be derived from a face mesh (i.e., a 3D model of a face of the subject). The face mesh may comprise a plurality of lines and vertices connecting one or more features of the face of the subject. The plurality of lines and vertices may be configured to model a positional relationship of each feature of the face of the subject, relative to an outline of the face of the subject or relative to one or more other features of the subject's face. The face mesh may be in the shape of the face of the subject. The face mesh may have one or more dimensions that are equal or proportional to one or more dimensions of the face of the subject. The face mesh may be generated by a face mesh generator comprising an image sensor, an RGB-D sensor, and/or a processor configured to construct a face mesh based on video data captured by the image sensor and the RGB-D sensor. The face mesh generator may be integrated with the device. Alternatively, the face mesh generator may be located remotely from the device.

Figure 4:
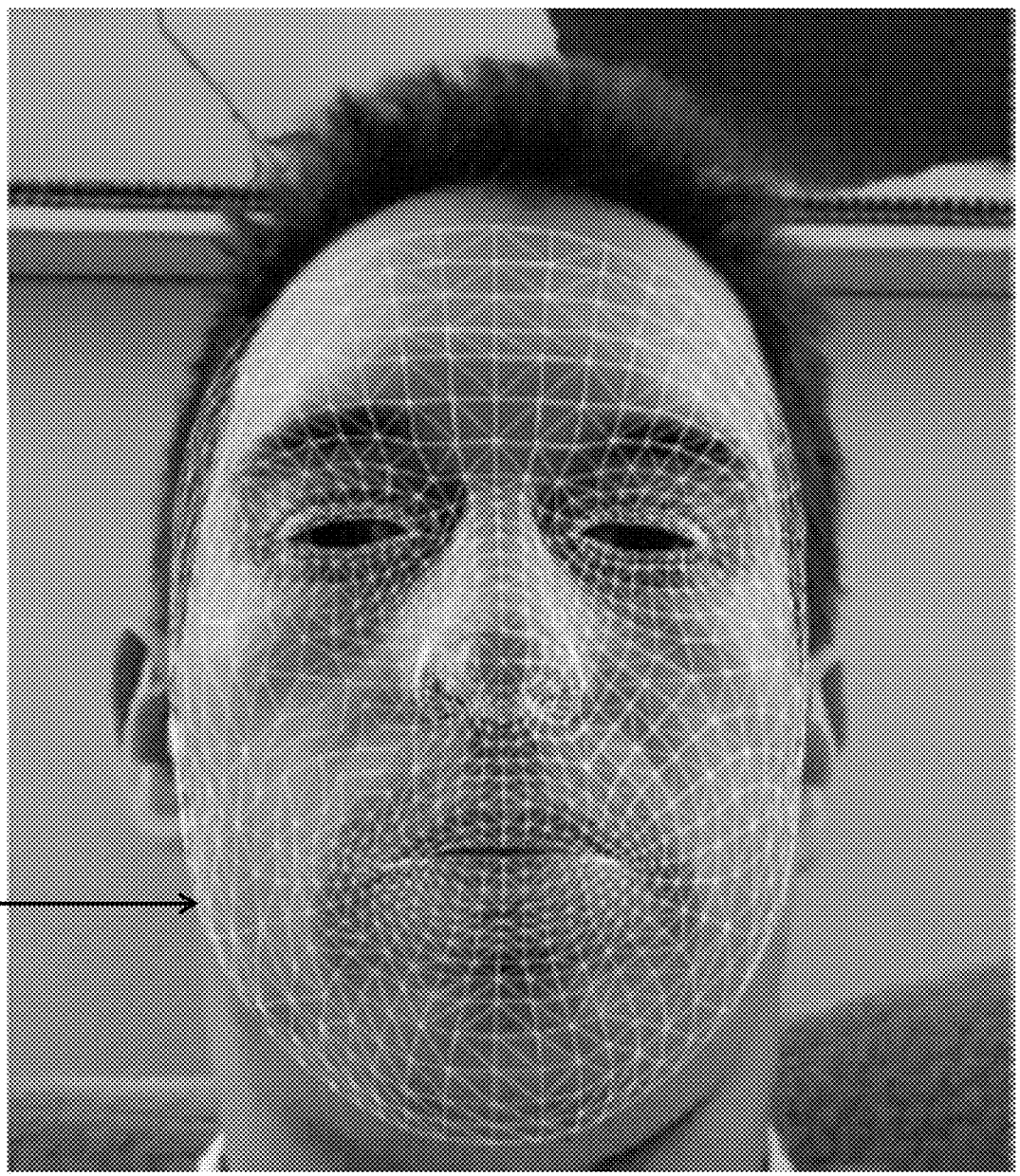
FIG. 4 schematically illustrates a face mesh, in accordance with some embodiments.

FIG. 4 illustrates a face mesh. The face mesh may be generated using iOS™ or Android™ software. The face mesh may be a representation of a face and/or a facial structure of the subject. The representation may comprise a plurality of cells meshed together to estimate a contour, a shape, and/or a size of the subject's face. In some cases, the plurality of cells may be meshed together to model the spatial and/or positional relationships between two or more portions or features of the subject's face. Each of the plurality of cells may have a cell shape. The cell shape may be a two-dimensional shape. The two-dimensional shape may be a triangle or a quadrilateral (e.g., a square or a rectangle). In some cases, the cell shape may be a three-dimensional shape. The three-dimensional shape may be a pyramid, a tetrahedron, a triangular prism, a hexahedron, or any polyhedron with three or more faces. The face mesh may comprise a plurality of cells arranged in a structured grid. In some cases, the face mesh may comprise a plurality of cells arranged in an unstructured grid or a hybrid grid comprising a mixture of structured grids and unstructured grids.

In some cases, the video data may be obtained using a plurality of sensors on the device. The plurality of sensors may comprise an image sensor and a depth sensor. In some cases, the image sensor and the depth sensor may be implemented using an RGB-D camera on the device. In some cases, the image sensor may comprise a front-facing camera, and the depth sensor may comprise an infrared (IR) sensor. In some cases, the position and pose of the subject's face in the 3-dimensional space may be located using a combination of RGB and RGB-D information in the video data. In some cases, the position and pose of one or more features of the subject's face in 3-dimensional space may be located using a combination of RGB and RGB-D information in the video data. The device may be configured to capture the video data at a rate that is between about 30 frames per second to about 240 frames per second. The device may or may not be a mobile device.

The method may further comprise generating a bounding box for each of the subject's left and right eye based in part on an approximate eye position and orientation for each of the subject's eyes. The method may comprise generating a plurality of bounding boxes comprising a left bounding box corresponding to a left eye of the subject and a right bounding box corresponding to a right eye of the subject. Each bounding box may be a virtual box superimposed on an image comprising the approximate eye position and orientation of the subject's left and right eyes. The bounding boxes may surround a portion of the image corresponding to a left eye and/or a right eye of the subject. The bounding box may be in the shape of a circle, triangle, square, rectangle, pentagon, hexagon, heptagon, octagon, nonagon, decagon, any polygon with three or more sides, or any combination of shapes thereof.

In some cases, the bounding boxes may be 2-dimensional boxes located in 3-dimensional space. The bounding boxes may be 2-dimensional boxes superimposed on an image comprising a two-dimensional or three-dimensional image representation of a left eye and/or a right eye of the subject. As described above, the bounding boxes may comprise (1) a left bounding box oriented orthogonal to a plane corresponding to an approximate eye position and orientation for the subject's left eye, and (2) a right bounding box oriented orthogonal to a plane corresponding to an approximate eye position and orientation for the subject's right eye. In some cases, the bounding boxes may be oriented orthogonal to a plane corresponding to an approximate orientation of the subject's face and/or an approximation orientation of one or more features of the subject's face.

Figure 5:
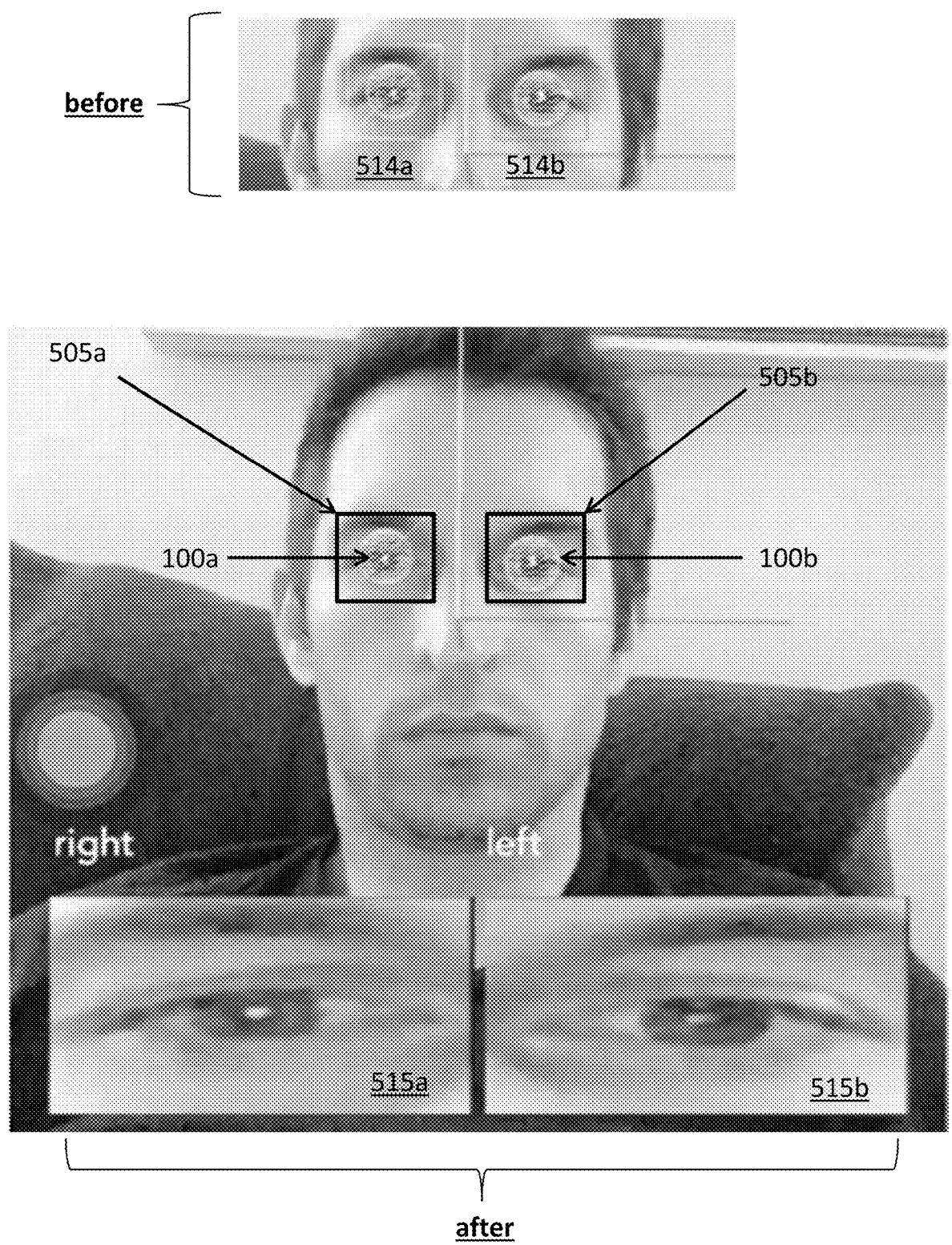
FIG. 5 schematically illustrates a pair of bounding boxes generated for each of the subject's left and right eyes, in accordance with some embodiments.

FIG. 5 illustrates a plurality of image representations 514a and 514b corresponding to the subject's right eye 100a and left eye 100b, respectively. As shown in FIG. 5, a plurality of bounding boxes comprising a right bounding box 505a and a left bounding box 505b may be superimposed on the plurality of image representations 514a and 514b corresponding to the subject's right eye 100a and left eye 100b. The right bounding box 505a may be superimposed on a portion of an image representation 514a of the subject's right eye 100a. The left bounding box 505b may be superimposed on a portion of an image representation 514b of the subject's left eye 100b. The right bounding box 505a may contain the subject's right eye 100a. The left bounding box 505b may contain the subject's left eye 100b.

In some cases, the bounding boxes may be unprojected from 3-dimensional space and imposed onto one or more 2-dimensional images of the subject's left and right eye, prior to applying a perspective correction to the bounding boxes. Unprojecting the bounding boxes from 3D space to 2D space may involve applying a transformation to each point defining the bounding boxes. The transformation may involve converting one or more 3D coordinates of the bounding boxes to pixel coordinates corresponding to a viewport of the image sensor used to capture one or more images of the subject's eyes. Converting the one or more 3D coordinates of the bounding boxes to pixel coordinates may involve projecting a ray from an aperture of the image sensor to one or more points in 3D space corresponding to the one or more 3D coordinates of the bounding boxes. An intersection of the ray with a viewport plane of the image sensor (i.e., a plane on which the aperture of the image sensor is located) may yield the 2D positions of one or more corners of the bounding boxes within one or more reference images of the subject's eyes. The one or more reference images of the subject's eyes may be image representations of the subject's left and/or right eye that are extractable from the reference frame of the subject's face. In some cases, unprojecting the bounding boxes from 3D space to 2D space may involve using one or more projection methods, separately or in combination with each other, to map 3D points to a 2D plane. The one or more projection methods may comprise parallel projection methods (e.g., orthographic projection, multi-view projection, axonometric projection, isometric projection, dimetric projection, trimetric projection, oblique projection, cavalier projection, cabinet projection, military projection) and/or perspective projection methods.

The method may further comprise applying a perspective correction to the bounding boxes and the 2-dimensional images of the subject's left eye and/or right eye (i.e., the image representations) to create modified image representations for each of the subject's left eye and right eye. A perspective correction may be an adjustment to flatten the 2D images of the subject's left and right eye to compensate for the fact that the image sensor's line of sight may not be perpendicular to the plane on which the 3D bounding boxes lie. As described above, the 3D bounding boxes may be oriented orthogonal to a plane corresponding to the approximate eye position and orientation for the subject's left eye and/or right eye. Alternatively, the bounding boxes may be oriented orthogonal to a plane corresponding to an approximate orientation of the subject's face. In either case, the bounding boxes may not be perpendicular to a line of sight of the image sensor. The 2D images of the subject's eyes may or may not be perpendicular to a line of sight of the image sensor. In some cases, a perspective correction may be applied to (i) orient a first plane containing the bounding box coordinates parallel to a viewport plane of the image sensor and/or (ii) orient a second plane containing the 2D images of the subject's eyes parallel to the viewport plane of the image sensor, thereby allowing the 3D coordinates of the bounding boxes to be mapped to the 2D images of the subject's eyes along an axis orthogonal to both the first plane and the second plane. The axis may coincide with a line of sight of the image sensor. In other cases, a perspective correction may be applied to (i) orient a first plane containing the bounding box coordinates at a first angle relative to the viewport plane of the image sensor and/or (ii) orient a second plane containing the 2D images of the subject's eyes at the first angle relative to the viewport plane of the image sensor, thereby allowing the 3D coordinates of the bounding boxes to be mapped to the 2D images of the subject's eyes along an axis orthogonal to both the first plane and the second plane. The axis may coincide with a line of sight of the image sensor.

As described above and shown in FIG. 5, a perspective correction may be applied to the image representations 514a and 514b of the subject's eyes to generate a plurality of modified image representations 515a and 515b corresponding to the right eye 100a and the left eye 100b of the subject.

The 3D coordinates of the bounding boxes 505a and 505b may be mapped to the modified image representations 515a and 515b for each of the subject's right eye 100a and left eye 100b. The modified image representations 515a and 515b may comprise uniform rectangular image representations for each of the subject's left and right eye. The uniform rectangular image representations may be derived from the image representations 514a and 514b of the subject's eyes after a perspective correction is applied to the image representations 514a and 514b for each of the subject's left and right eyes.

The method may further comprise extracting a plurality of landmarks from the modified image representations of the subject's left and right eye. The plurality of landmarks may comprise a plurality of points representing a circumference of a pupil of the subject. The plurality of landmarks may further comprise a point representing the center of the pupil. In some embodiments, the plurality of landmarks may comprise a plurality of points representing a boundary of the subject's iris and/or a center of the iris. In some cases, the plurality of landmarks may be obtained from a set of static features located anywhere on the surface of an eye ball of the subject. The surface of the eye ball includes the pupil, iris and/or sclera. As an example, the plurality of landmarks may comprise a plurality of points located anywhere on the pupil, iris and/or sclera. The plurality of landmarks may be used to locate an optimal eye position for each of the subject's left and right eye to enable tracking of the subject's gaze. The optimal eye position may be an estimated eye position selected from a plurality of candidate eye positions. The estimated eye position may be selected based on a minimization of radial variances. The radial variations may correspond to variations between two or more distances between two or more landmarks and a center of the subject's pupil.

In some cases, the plurality of landmarks may be extracted using a deep learning model. The deep learning model may comprise a convolutional neural network (CNN).

In some cases, the plurality of landmarks may comprise a plurality of point estimates within the 2-dimensional image representations of the subject's left and/or right eye. The plurality of point estimates may comprise at least one center point estimate corresponding to a pupil center for each of the subject's left and right eye. In some cases, the plurality of point estimates may comprise a plurality of circumferential point estimates surrounding the subject's left and right pupils. In some cases, the plurality of point estimates may comprise a plurality of boundary point estimates surrounding the subject's left and right irises. In some cases, the plurality of point estimates may comprise a plurality of point estimates located anywhere on the surface of an eye ball of the subject.

In some cases, the plurality of point estimates may comprise at least three circumferential point estimates surrounding each of the subject's left and right pupils. Additionally or optionally, the plurality of point estimates may comprise at least three boundary point estimates surrounding each of the subject's left and right irises. In some cases, the plurality of point estimates may comprise at least eight circumferential point estimates surrounding the pupil for each of the subject's left and right eye. Additionally or optionally, the plurality of point estimates may comprise at least eight boundary point estimates surrounding each of the subject's left and right irises. The plurality of landmarks may be distinct from one another.

Figure 6:
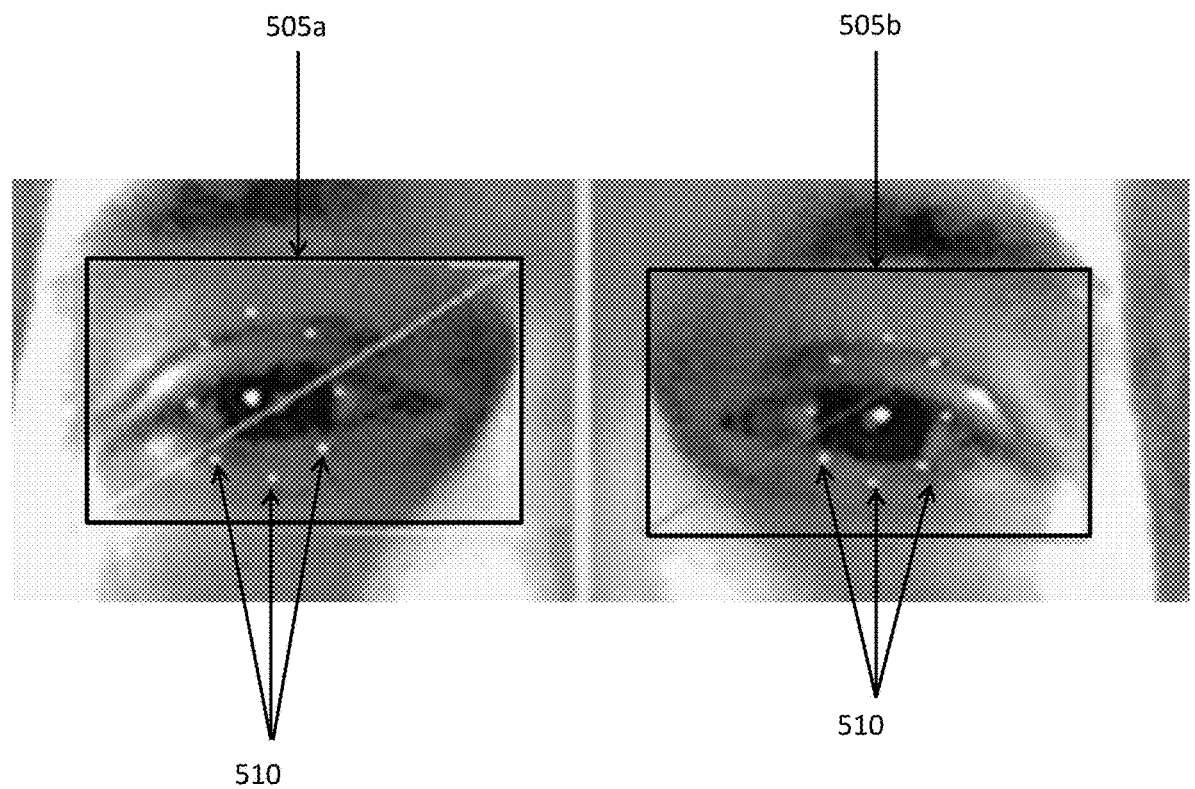
FIG. 6 schematically illustrates a plurality of landmarks mapped to bounding boxes for each of a subject's eyes, in accordance with some embodiments.

FIG. 6 illustrates a plurality of point estimates corresponding to the plurality of landmarks extracted from the modified image representations of the subject's left and right eye. In some cases, the method may further comprise mapping the plurality of landmarks extracted from the modified image representations 515a and 515b to the bounding boxes 505a and 505b in three-dimensional space. Mapping the plurality of landmarks extracted from the modified image representations 515a and 515b to the bounding boxes 505a and 505b in three-dimensional space may involve mapping one or more 2D coordinates of the plurality of landmarks to a plane (e.g., a bounding box plane) on which the bounding boxes are located. The 2D coordinates of the plurality of landmarks may be mapped to 3D coordinates by normalizing the 2D coordinates relative to the bounding box frames, in pixel values. The normalized points may be scaled to real-world coordinates based on the 3D bounding box frame, defined in real-world coordinates. Such scaling may allow the 2D coordinates of the plurality of landmarks to be mapped to 3D coordinates located on a plane containing the bounding box.

The systems and methods disclosed herein may be implemented to track a subject's gaze. In some cases, the subject's gaze may be tracked in part based on one or more gaze vectors associated with at least one of the subject's left eye or right eye. In other cases, the subject's gaze may be tracked in part based on one or more gaze vectors associated with each of the subject's left eye and right eye.

In another aspect, the present disclosure provides a system for implementing gaze tracking. The system may comprise: one or more processors; and a memory comprising machine-executable instructions that, upon execution by the one or more processors, implements a method for tracking a subject's gaze. The method may comprise: (a) locating, for each of the subject's left eye and right eye, an approximate eye position and orientation relative to a reference frame of the subject's face in 3-dimensional space; (b) generating bounding boxes for each of the subject's left and right eye based in part on the corresponding approximate eye position and orientation; (c) applying a perspective correction to the bounding boxes and 2-dimensional images of the subject's left and right eye to create a modified image representation for each of the subject's left eye and right eye; and (d) extracting a plurality of landmarks from the modified image representations of the subject's left and right eye. The plurality of landmarks may be used to locate an optimal eye position for each of the subject's left and right eye to enable the tracking of the subject's gaze.

In some cases, the video data may be obtained using a plurality of sensors on a device. The device may or may not be a mobile device. The plurality of sensors may comprise an image sensor and/or a depth sensor. The memory and the one or more processors may be located onboard the device. Alternatively, the memory and the one or more processors may be located remote from the device.

In another aspect, the present disclosure provides a non-transitory computer readable-medium comprising machine-executable instructions that, upon execution by one or more processors, may implement a method for tracking a subject's gaze. The method may comprise: (a) processing video data to locate, for each of the subject's left eye and right eye, an approximate eye position and orientation relative to a reference frame of the subject's face in 3-dimensional space; (b) generating a bounding box for each of the subject's left and right eye based in part on the corresponding approximate eye position and orientation; (c) applying a perspective correction to the bounding boxes and 2-dimensional images of the subject's left and right eye to create a modified image representation for each of the subject's left eye and right eye;

and (d) extracting a plurality of landmarks from the modified image representations of the subject's left and right eye, wherein the plurality of landmarks is used to locate an optimal eye position for each of the subject's left and right eye to enable the tracking of the subject's gaze.

In another aspect, the present disclosure provides a method for performing auto-calibration for gaze tracking. Auto-calibration may involve locating a best eye position by minimizing radial variations. The radial variations may correspond to variations between two or more distances between two or more landmarks and the center of the subject's pupil. The method may comprise: (a) obtaining a plurality of landmarks from an image representation of at least one of a subject's left or right eye; (b) generating a plurality of candidate eye positions, wherein each candidate eye position may be represented by an eye ball mesh having a different position and orientation; and (c) selecting an optimal candidate eye position from the plurality of candidate eye positions, based in part on a plurality of intersections between (i) a plurality of projected lines associated with the plurality of landmarks and (ii) the eye ball meshes for the plurality of candidate eye positions. In some embodiments, the auto-calibration process may be performed without requiring or processing glint information.

In some cases, the steps of (a)-(c) may be performed on a video frame. A video frame may comprise an image of the left eye and/or an image of the right eye of the subject. The video frame may be extracted from the video data captured by the device. In some cases, the video data may comprise a series of video frames that are chronologically ordered. Each video frame of the series of video frames may comprise new information corresponding to a different point in time. The new information may comprise a new image of the subject's eyes. The new image may comprise an image of the subject's eyes that is different than one or more previous images of the subject's eyes extracted from previous video frames. In an example, a previous image of the subject's eyes may comprise information relating to a first eye position and/or a first eye orientation, and a new image of the subject's eyes may comprise information relating to a second (i.e., new) eye position and/or a second (i.e., new) eye orientation.

In some cases, the method may further comprise repeating steps (a)-(c) for each new video frame comprising new information on a position and/or an orientation of the subject's eyes. In some cases, steps (a)-(c) may be repeated substantially in real time as each new video frame is received and/or processed.

In some cases, the video frame may be obtained using a plurality of sensors on a device. The device may or may not be a mobile device. The plurality of sensors may comprise an image sensor and/or a depth sensor. The image sensor and/or the depth sensor may be implemented using an RGB-D camera on the device. The image sensor may comprise a front-facing camera, and the depth sensor may comprise an infrared (IR) sensor. The video frame may comprise RGB and/or RGB-D information.

As described above, the plurality of landmarks may be obtained from one or more image representations of each of a subject's left and right eye. In some cases, the one or more image representations of each of the subject's left and right eye may correspond to one or more modified image representations of each of the subject's left and right eye. The plurality of landmarks may be extracted from the one or more image representations using a deep learning model such as a convolutional neural network (CNN). The plurality of landmarks may comprise a plurality of point estimates within the 2-dimensional image representations of each of the subject's left and right eye. The plurality of point estimates may comprise at least one center point estimate corresponding to a pupil center for each of the subject's left and right eye. The plurality of point estimates may comprise a plurality of circumferential point estimates surrounding the pupil for each of the subject's left and right eye. In some embodiments, the plurality of point estimates may comprise a plurality of boundary point estimates surrounding the iris for each of the subject's left and right eye. In some cases, the plurality of point estimates may comprise a plurality of point estimates located anywhere on the surface of an eye ball of the subject.

The plurality of landmarks may be projected along a normal of a bounding box for each of the subject's left and right eye. The plurality of landmarks may be projected forward along a normal of each bounding box for each eye by a pre-determined distance. The pre-determined distance may range from about 0.1 centimeters (cm) to about 10 cm. The plurality of landmarks projected along the normal of each bounding box may be a plurality of extended landmarks.

In some cases, the method may comprise generating a plurality of candidate eye positions. Each of the plurality of candidate eye positions may represent an estimation of a position of the subject's left eye or right eye. Each candidate eye position of the plurality of candidate eye positions may be represented by an eye ball mesh having a different position and/or orientation.

Figure 7:
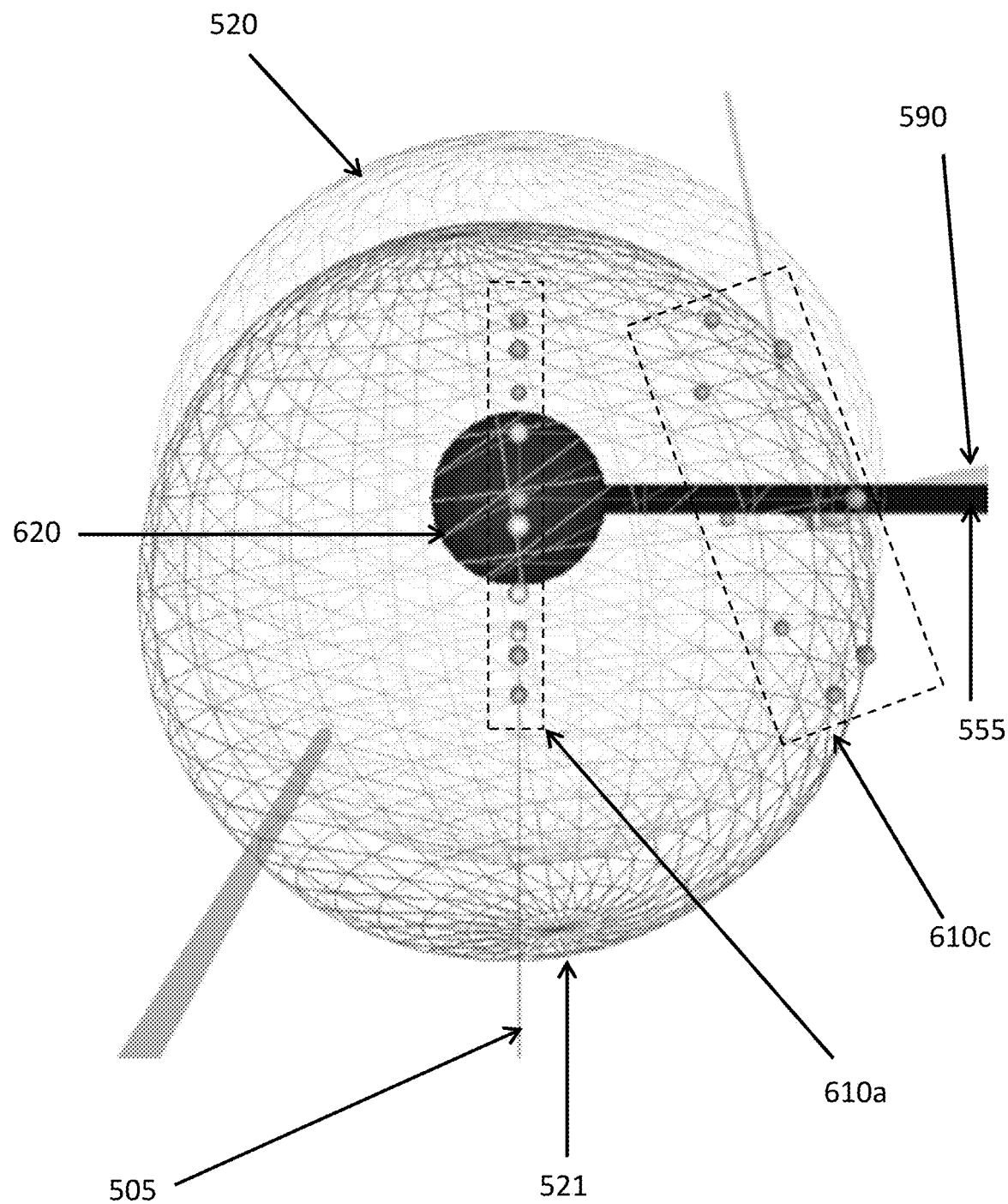
FIG. 7 schematically illustrates eye ball mesh models corresponding to an approximate eye position and a candidate eye position, in accordance with some embodiments.

FIG. 7 illustrates a top-down view of an approximate eye position 520 and a candidate eye position 521. Each of the approximate eye position 520 and the candidate eye position 521 may be represented by a corresponding eye ball mesh with a different position and orientation.

An eye ball mesh may be a mesh model approximating the size, shape, position, and/or orientation of an eye ball of the subject. The eye ball mesh may be generated based on a reference mesh model generated by a standard primitive generator. The standard primitive generator may be a mesh model generator implemented using a combination of hardware (e.g., one or more processors) and 3D modeling software. The standard primitive generator may be a part of the iOS™ or Android™ operating system. The reference mesh model may be in the shape of a sphere. The reference mesh model may be manipulated in 3D modeling software using manual and/or scripted methods to generate a mesh with more complex geometries. The more complex geometries may be created using manual methods, which may involve modifications to the reference mesh model by hand (e.g., manipulations performed on the reference mesh model based on one or more physical inputs provided by the subject). In some cases, the more complex geometries may be created using scripted methods, which may involve software-based modifications to the reference mesh model based on one or more input parameters provided by the subject. In some cases, the one or more input parameters may be measured and obtained using one or more sensors located on or remote to the device. In some cases, the eye ball mesh may be spherical in shape. In other cases, the eye ball mesh may be non-spherical in shape. In some cases, the eye ball mesh may be generated in part based on an intersection of two or more spheres.

As shown in FIG. 7, in some cases, the position and/or orientation of each eye ball mesh associated with each candidate eye position may be defined relative to an approximate eye reference position 620. The approximate eye reference position 620 may correspond to an approximate center of the eye associated with the approximate eye position 520. The position and orientation of each eye ball mesh associated with a candidate eye position may comprise a relative translation to the approximate eye reference position 620, for each candidate eye position. Further, the orientation of each eye ball mesh associated with a candidate eye position may comprise a relative rotation to the approximate eye reference position 620, for each candidate eye position. In some cases, the relative translations and relative rotations may be estimated based on one or more inputs provided by the RGB-D sensor. The one or more inputs may comprise an approximate head position, an approximate head orientation, an approximate eye position, and/or an approximate eye orientation. The approximate head position, the approximate head orientation, the approximate eye position, and/or the approximate eye orientation may be derived in part based on a face mesh and/or an image representation of the subject's left and/or right eyes. The relative translations and/or the relative orientations may be derived in part based on the approximate head position, the approximate head orientation, the approximate eye position, and/or the approximate eye orientation. The approximate head position, the approximate head orientation, the approximate eye position, and/or the approximate eye orientation may be estimated based on one or more measurements provided by the plurality of sensors operatively coupled to the device. In some cases, the approximate head position, the approximate head orientation, the approximate eye position, and/or the approximate eye orientation may be provided by a mobile operating system. The mobile operating system may be, for example, an iOS™ operating system, an Android™ operating system, or the like.

Figure 12:
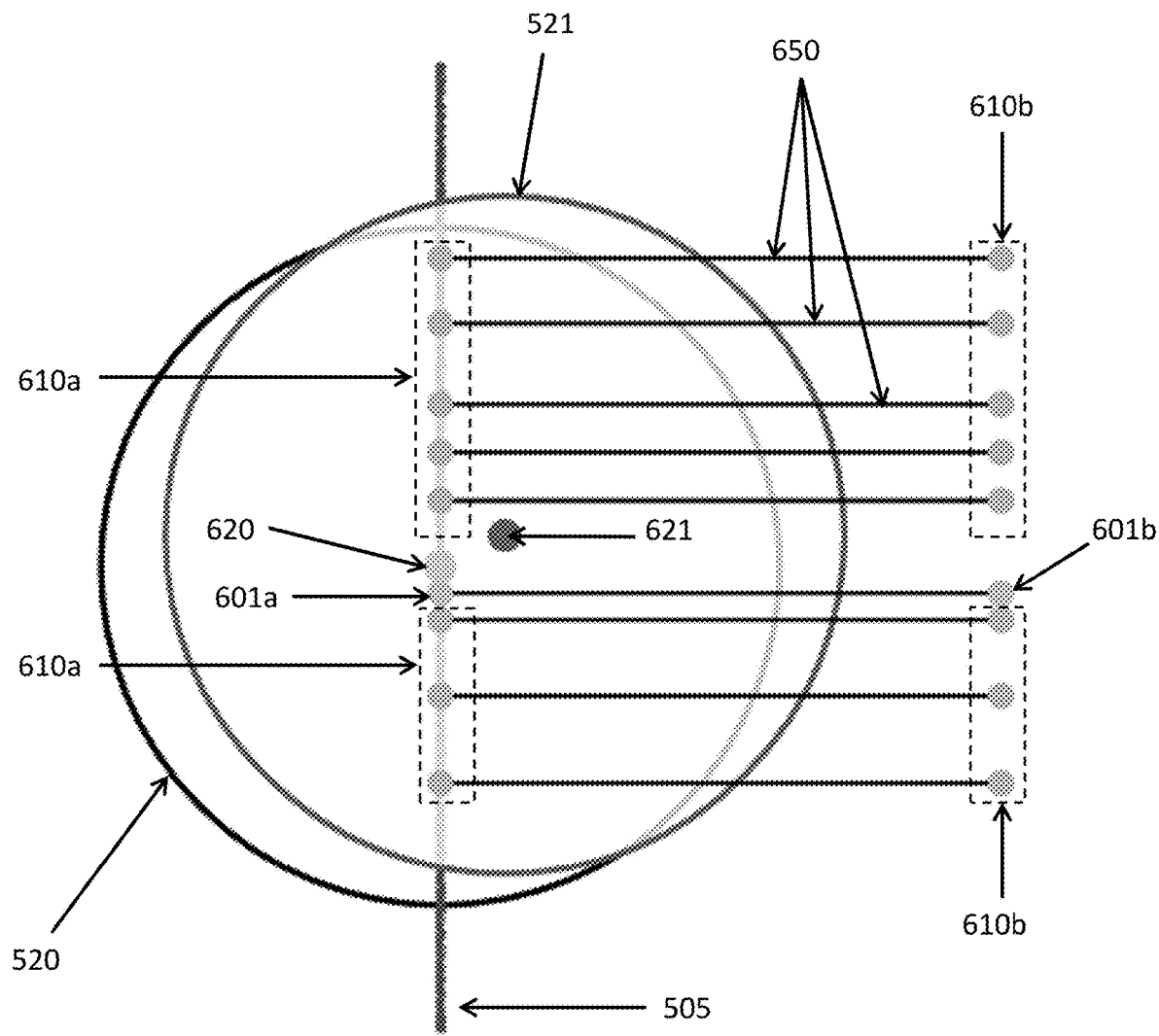

As described above and shown in FIG. 7, the method may comprise projecting a plurality of landmarks 610a located on a plane of the bounding box 505 along a normal 555 of a bounding box, for each of the subject's left and right eye. As shown in FIG. 7 and FIG. 12, the plurality of landmarks 610a located on a plane of the bounding box 505 may be projected along a plurality of projected lines 650 parallel to the normal 555 of each bounding box 505, for each of the subject's left and right eye.

The method may further comprise selecting an optimal candidate eye position from the plurality of candidate eye positions, based in part on a plurality of intersections between (i) a plurality of projected lines associated with the plurality of landmarks and (ii) the eye ball meshes for the plurality of candidate eye positions. The plurality of projected lines may extend from an origin point in the approximate eye reference position to one or more extended positions associated with the plurality of extended landmarks projected along the normal of each bounding box by a pre-determined distance. The origin point may refer to the 3D coordinates of the plurality of landmarks after the plurality of landmarks have been mapped from 2D space to the bounding boxes in 3D space. The plurality of intersections may refer to intersections between the plurality of projected lines and the eye ball meshes corresponding to the plurality of candidate eye positions. Each of the plurality of intersections may reflect where the plurality of landmarks would be positioned in 3D space when projected onto a surface of an eye ball mesh model. Each of the plurality of intersections may be referred to as a mesh hit. Each mesh hit may reflect a location on the eye ball mesh model of the candidate eye position where a pupil boundary would be projected in 3D space. The location of each mesh hit may be based in part on one or more spatial relationships between the bounding boxes, the 2-dimensional images of the subject's left and right eye, one or more modified image representations for each of the subject's left eye and right eye, and/or one or more reference coordinate frames corresponding to a face and/or an eye of the subject. In some cases, the plurality of intersections may be distributed on a surface of each of the eye ball meshes. In some cases, the plurality of intersections may comprise a set of intersections associated with each of the plurality of candidate eye positions.

In some cases, the method may further comprise: calculating a distance between a pupil boundary point and a pupil center point, for each set of intersections associated with each candidate eye position. The method may further comprise generating a list of radial distances describing the radial distances between pupil boundary points and pupil center points for each set of landmarks for each candidate eye position. In some embodiments, the method may further comprise generating a list of radial distances describing the radial distances between iris boundary points and pupil center points for each set of landmarks for each candidate eye position. The method may further comprise calculating a coefficient of variation for the list of radial distances, and selecting an optimal candidate eye position by comparing the coefficient of variation for the list of radial distances across the plurality of candidate eye positions. The coefficient of variation may be based in part on a standard deviation value calculated from the list of radial distances. Comparing the coefficient of variation for the list of radial distances across the plurality of candidate eye positions may involve determining which candidate eye position yields a set of landmark points most uniformly distributed (e.g., by distance to the pupil center or by angular orientation around the pupil center) along the eye ball mesh. The candidate eye position yielding a set of landmark points that are most uniformly distributed along the eye ball mesh may be the optimal candidate eye position. In some cases, the optimal candidate eye position may be the candidate eye position with a set of radial distance values having the lowest standard deviation relative to other sets of radial distance values associated with other candidate eye positions.

FIG. 7 illustrates a candidate eye position 521. In some cases, the candidate eye position 521 may be an optimal candidate eye position. In such cases, the plurality of landmarks 610c may be mapped to a surface of an eye ball mesh model associated with the optimal candidate eye position. The plurality of landmarks 610c mapped to a surface of an eye ball mesh model associated with the optimal candidate eye position may be used to generate a ray 590. The ray 590 may represent a gaze vector associated with a left eye or a right eye of the subject. The gaze vector may represent a vector directed at an object that the subject is looking at. In some cases, the gaze vector may represent a vector directed at a point or region in 3D space that the subject is focused on and/or looking at.

Figure 8:
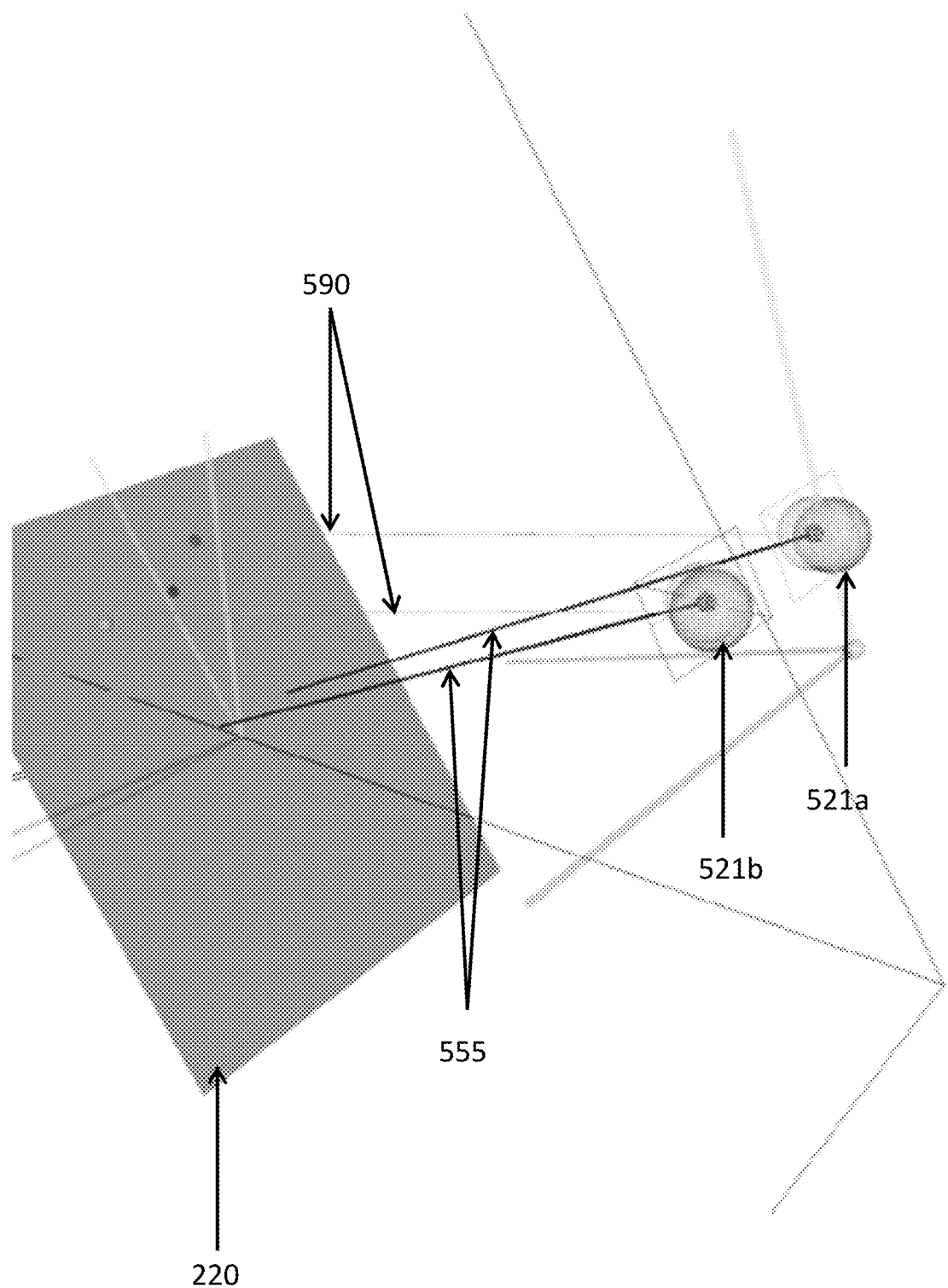
FIGS. 8 and 9 schematically illustrate one or more rays generated by the gaze tracking system for each of the subject's eyes, in accordance with some embodiments.
Figure 9:
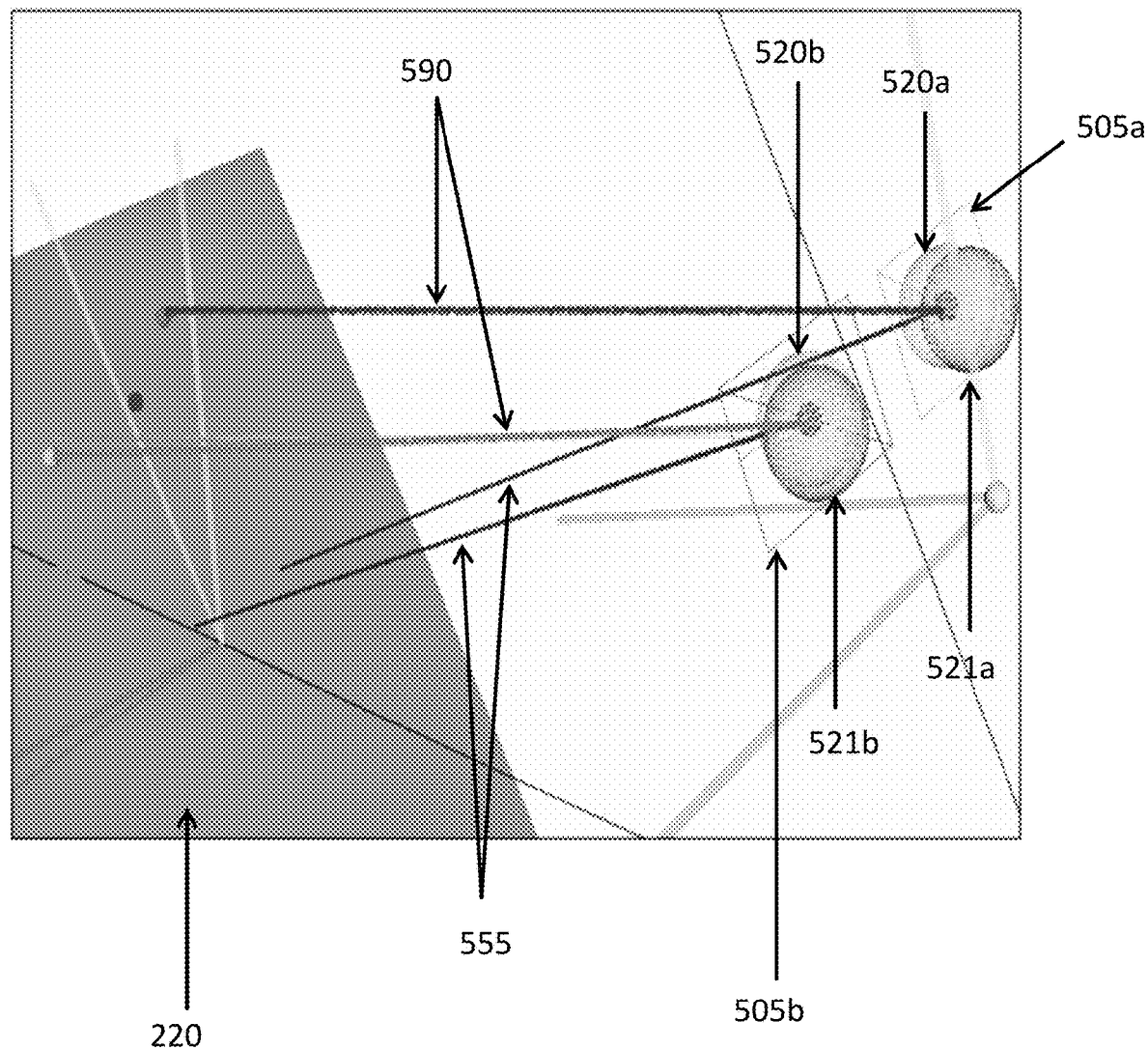

As shown in FIGS. 8-9, the gaze tracking system may be configured to generate a ray 590 for each of the subject's left and right eyes. The system may be configured to estimate a gaze point of the subject based on an intersection of each ray 590 with a device screen plane 220 corresponding to a location of the screen of the device in 3D space. Each of the rays 590 may extend from a candidate eye position (e.g., a right candidate eye position 521a and a left candidate eye position 521b) associated with each of the subject's right and left eyes. Each of the rays 590 may extend in a direction derived in part based on the location of the plurality of landmarks 610c mapped to a surface of an eye ball mesh model associated with the candidate eye positions 521a and

Figure 10:
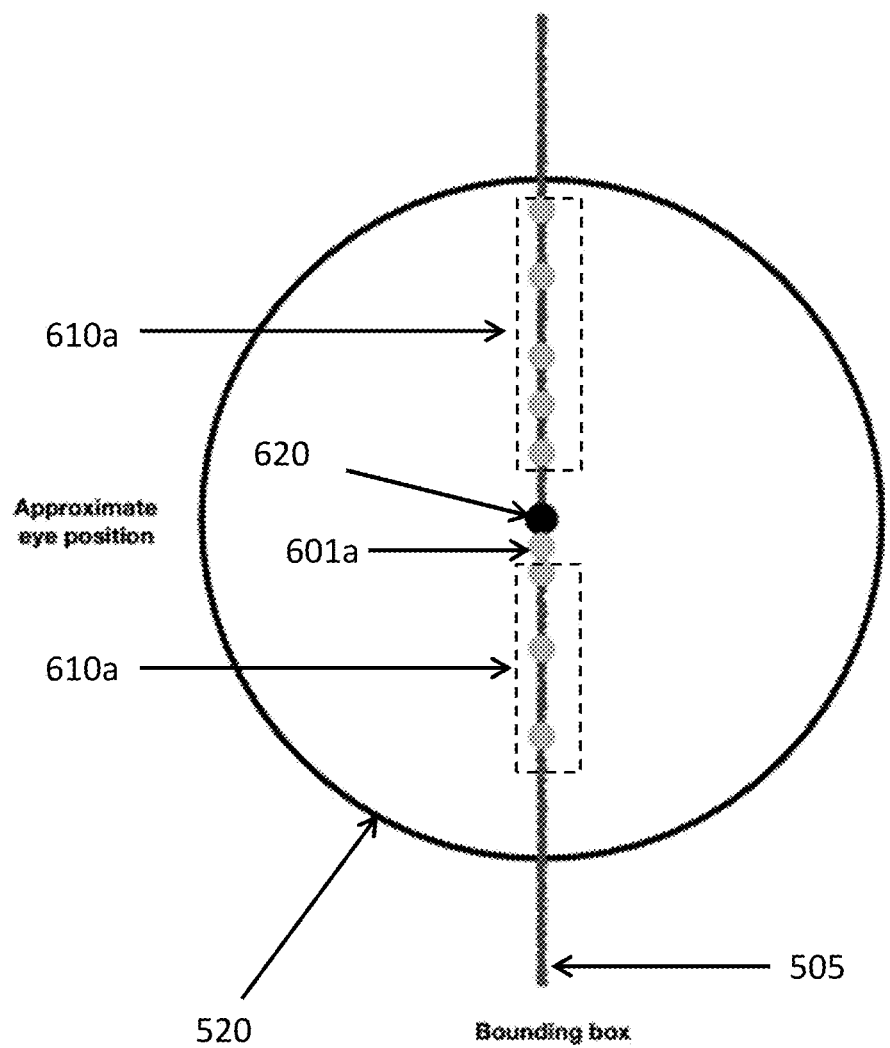
FIGS. 10, 11, 12, 13, 14, 15, and 16 schematically illustrate an example of a method for performing auto-calibration and gaze mapping, in accordance with some embodiments.
Figure 11:
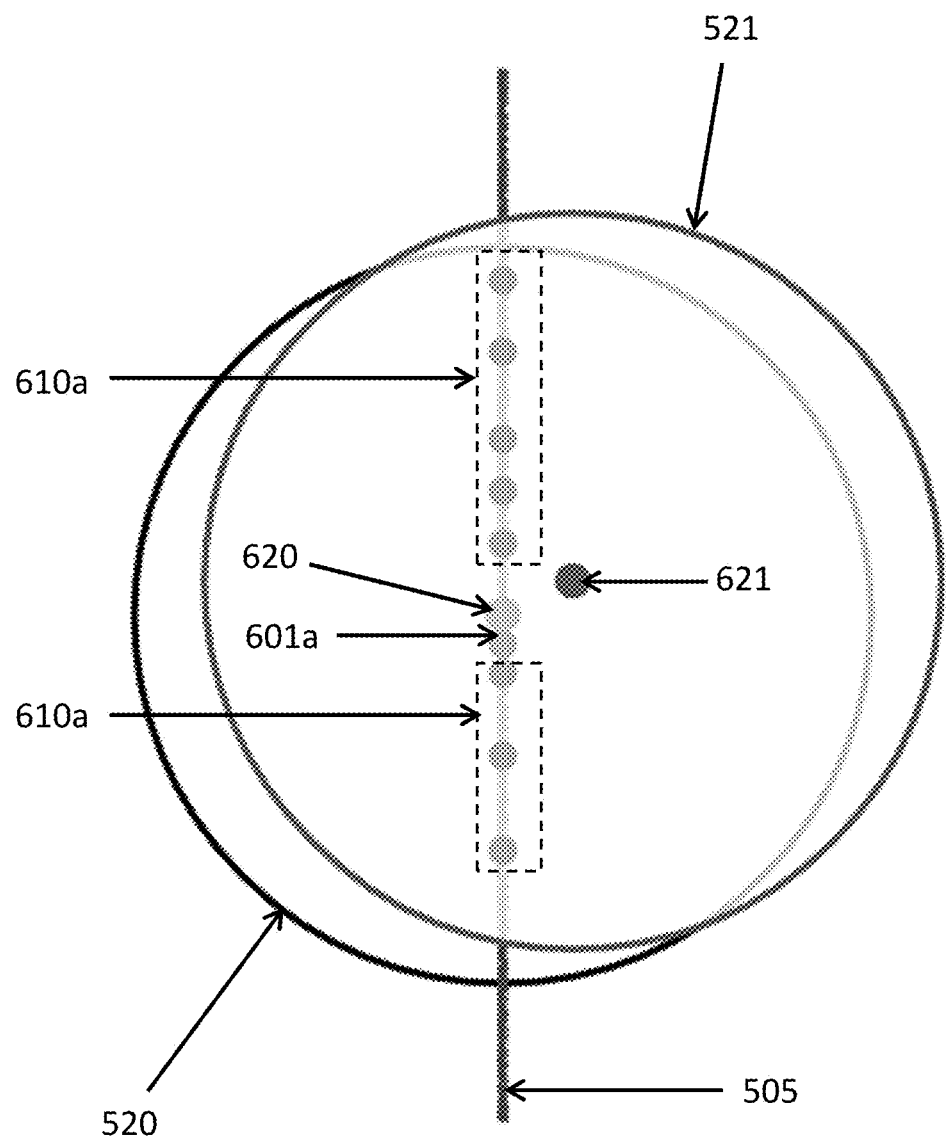

521*b*. The rays 590 may extend in a direction or orientation that is distinct from a normal 555 extending from a plane on which a bounding box 505*a* or 505*b* is located in 3D space. As described above, the plurality of landmarks extracted from the modified image representations of the subject's left and right eyes may be mapped to the bounding boxes 505*a* and 505*b*. As shown in FIG. 7 and FIG. 10, a plane containing the bounding box 505 (i.e., one of the bounding box 505*a* or the 505*b*) may intersect the approximate eye reference position 620 corresponding to an approximate center of the subject's eye based on the approximate eye position 520. The bounding box 505 may lie on a plane containing the plurality of landmarks extracted from the modified image representations of the subject's left and right eyes and subsequently mapped to the bounding boxes 505*a* and 505*b* in 3D space.

FIGS. 10-14 illustrate an example of a method for performing auto-calibration for gaze tracking. FIGS. 10-16 show a top-down view of an approximate eye position 520 corresponding to one of the subject's eye. As described above, an approximate eye reference position 620 corresponding to an approximate center of the approximate eye position 520 may lie on a plane (e.g., a bounding box plane) containing the bounding box 505. The bounding box plane may also contain a 2D pupil center 601*a* and plurality of landmarks 610*a* extracted from the one or more modified image representations of the subject's eyes.

FIGS. 11-16 show a top-down view of a candidate eye position 521. The candidate eye position 521 may be represented by an eye ball mesh with a different position and orientation than an eye ball mesh corresponding to the approximate eye position 520. The position and orientation of the eye ball mesh associated with the candidate eye position 521 may comprise a relative translation and/or a relative rotation to the approximate eye reference position 620 associated with the approximate eye position 520. The candidate eye position 521 may have a calibrated position (i.e., a calibrated eye center) 621 corresponding to a calibrated center of the candidate eye position 521.

FIG. 12 shows the 2D pupil center 601*a* and the plurality of landmarks 610*a* projected along a plurality of projected lines 650 parallel to a normal of the bounding box 505. The plurality of landmarks 610*a* may become a plurality of extended landmarks 610*b* after being projected along the plurality of projected lines 650 parallel to the normal of the bounding box. The 2D pupil center 601*a* may become an extended 2D pupil center 601*b* after being projected along a projected line 650 parallel to the normal of the bounding box.

Figure 13:
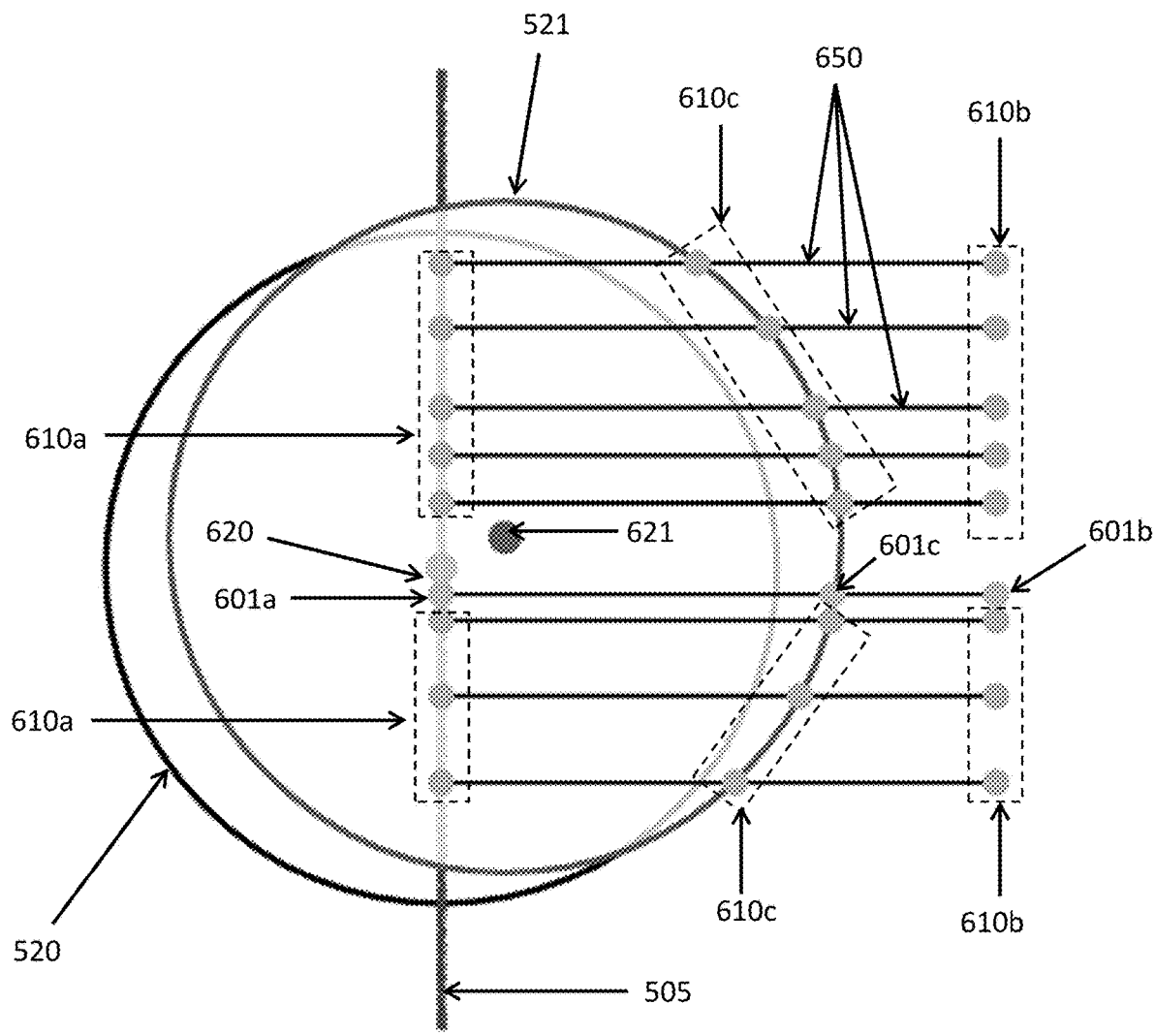
Figure 14:
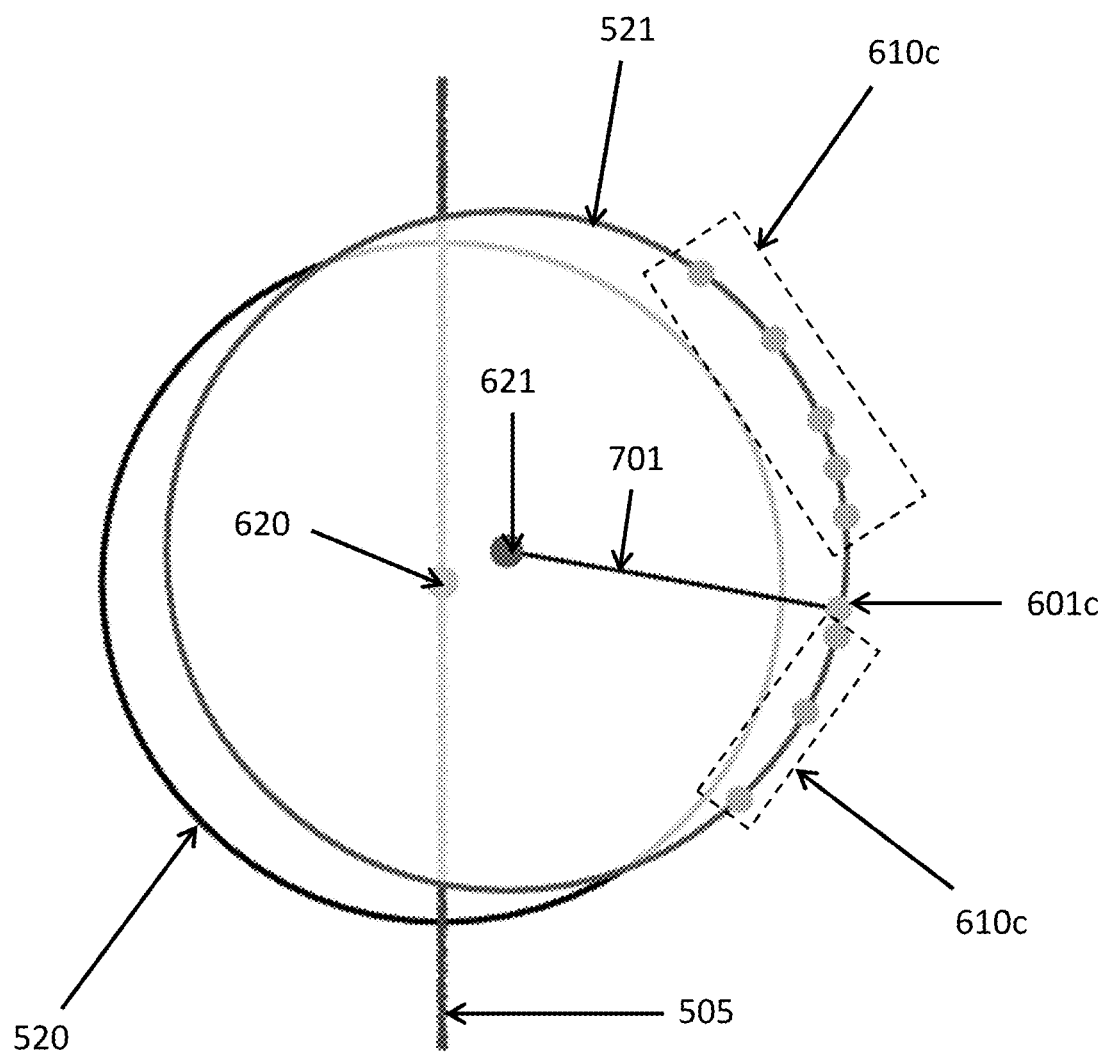

FIGS. 13-14 shows a plurality of intersections between the plurality of projected lines 650 and the eye ball mesh corresponding to the candidate eye position 521. The plurality of intersections may correspond to a 3D pupil center 601*c* and a set of 3D landmark positions 610*c*. The plurality of intersections may reflect where the 2D pupil center 601*a* and the plurality of landmarks 610*a* extracted from one or more modified image representations of the subject's eyes would be positioned in 3D space when projected onto a surface of an eye ball mesh model corresponding to the candidate eye position 521. Each of the plurality of intersections may reflect a location on the eye ball mesh model of the candidate eye position where a pupil center or a pupil boundary would be projected in 3D space. The plurality of intersections may represent a corresponding 3D position of the 2D pupil center 601*a* and the plurality of landmarks 610*a* after being projected onto a surface of the eye ball mesh associated with the candidate eye position 521.

The systems and methods disclosed herein may be implemented to perform auto-calibration for gaze tracking. In some cases, auto-calibration may involve locating a best eye position for at least one of the subject's left eye or right eye. In other cases, auto-calibration may involve locating best eye positions for each of the subject's left eye and right eye.

In another aspect, the present disclosure provides a system for performing auto-calibration for gaze tracking. The system may comprise: one or more processors; and memory comprising machine-executable instructions that, upon execution by the one or more processors, implements a method for performing auto-calibration for gaze tracking. The method may comprise: (a) obtaining a plurality of landmarks from an image representation of each of a subject's left and right eye; (b) generating a plurality of candidate eye positions, wherein each candidate eye position is represented by an eye ball mesh having a different position and orientation; and (c) selecting an optimal candidate eye position from the plurality of candidate eye positions, based in part on a plurality of intersections between (i) a plurality of projected lines associated with the plurality of landmarks and (ii) the eye ball meshes for the plurality of candidate eye positions. In some cases, the memory and the one or more processors may be located onboard a device. The device may or may not be a mobile device.

In another aspect, the present disclosure provides a non-transitory computer readable-medium comprising machine-executable instructions that, upon execution by one or more processors, may implement a method for performing auto-calibration for gaze tracking. The method may comprise: (a) obtaining a plurality of landmarks from an image representation of each of a subject's left and right eye; (b) generating a plurality of candidate eye positions, wherein each candidate eye position is represented by an eye ball mesh having a different position and orientation; and (c) selecting an optimal candidate eye position from the plurality of candidate eye positions, based in part on a plurality of intersections between (i) a plurality of projected lines associated with the plurality of landmarks and (ii) the eye ball meshes for the plurality of candidate eye positions.

In another aspect, the present disclosure provides a method for gaze mapping. The method may comprise: (a) selecting an optimal candidate eye position from a plurality of candidate eye positions for each of a subject's left and right eye. Each candidate eye position may be represented by an eye ball mesh having a different position and orientation. The method may further comprise: (b) using the optimal candidate eye positions to locate a gaze origin and generate a gaze extent for each of the subject's left and right eye; (c) locating a device screen plane that is indicative of a position of a screen of a device, using in part positional and hardware information associated with the device; and (d) mapping the gaze extent for each of the subject's left and right eye onto the device screen plane to determine the subject's gaze position. The gaze position may correspond to a gaze point, which may be a region within a visual image perceived by the subject that the subject is focused on.

The gaze mapping steps of (a)-(d) may be performed in real-time as the subject is looking at the screen of the device. The screen of the device may or may not be moving relative to the subject while the subject is looking at the screen of the device. In some cases, the gaze mapping steps of (a)-(d) may be performed while the subject is rotating the device and/or moving the device relative to a position and/or an orientation of the subject. In other cases, the gaze mapping steps of (a)-(d) may be performed while the subject is rotating the device and/or moving the device relative to a position and/or an orientation of one or more features of the subject, such as the head, the face, the eyes, and/or the pupils of the subject. Alternatively, the gaze mapping steps of (a)-(d) may be performed while the subject is moving relative to the screen of the device. For example, the gaze mapping steps of (a)-(d) may be performed while the subject's head or face is moving and/or rotating relative to the position and/or orientation of the screen of the device. In some cases, the gaze mapping methods disclosed herein may further comprise prompting the subject to look at one or more points on a screen of the device while the subject or a feature of the subject (e.g., the head of the subject) is moving and/or rotating relative to the screen of the device. In such cases, the gaze of the subject may be tracked, mapped, confirmed, and/or updated in part based on one or more gaze vectors derived for the subject's left and/or right eye, while the subject or a feature of the subject is moving and/or rotating relative to the screen of the device.

As described elsewhere herein, the device may or may not be a mobile device. In some cases, the screen may be operably coupled to the mobile device. In other cases, the screen may be provided as a separate peripheral component configured to be releasably and/or operably coupled to the mobile device.

The method may comprise selecting an optimal candidate eye position for each of the left eye and the right eye of the subject. The method may further comprise locating a gaze origin of the subject. The gaze origin may be located at a distance from a pupil center along an eye axis for each of the subject's left and right eye. The eye axis may be obtained by a projecting a vector from a center of the eye of the subject to a pupil center, along a Z-axis of each of the optimal candidate eye positions.

Figure 15:
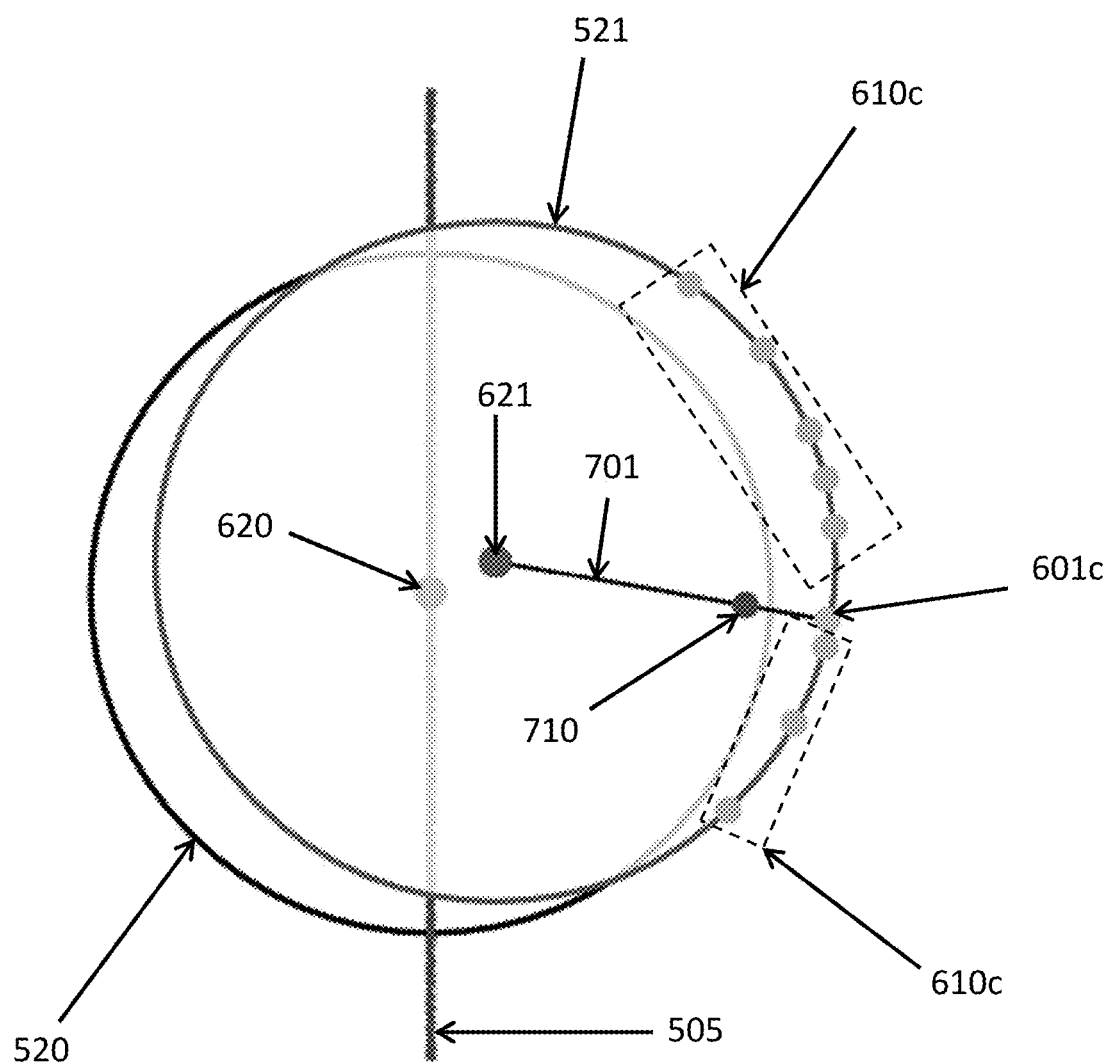
Figure 16:
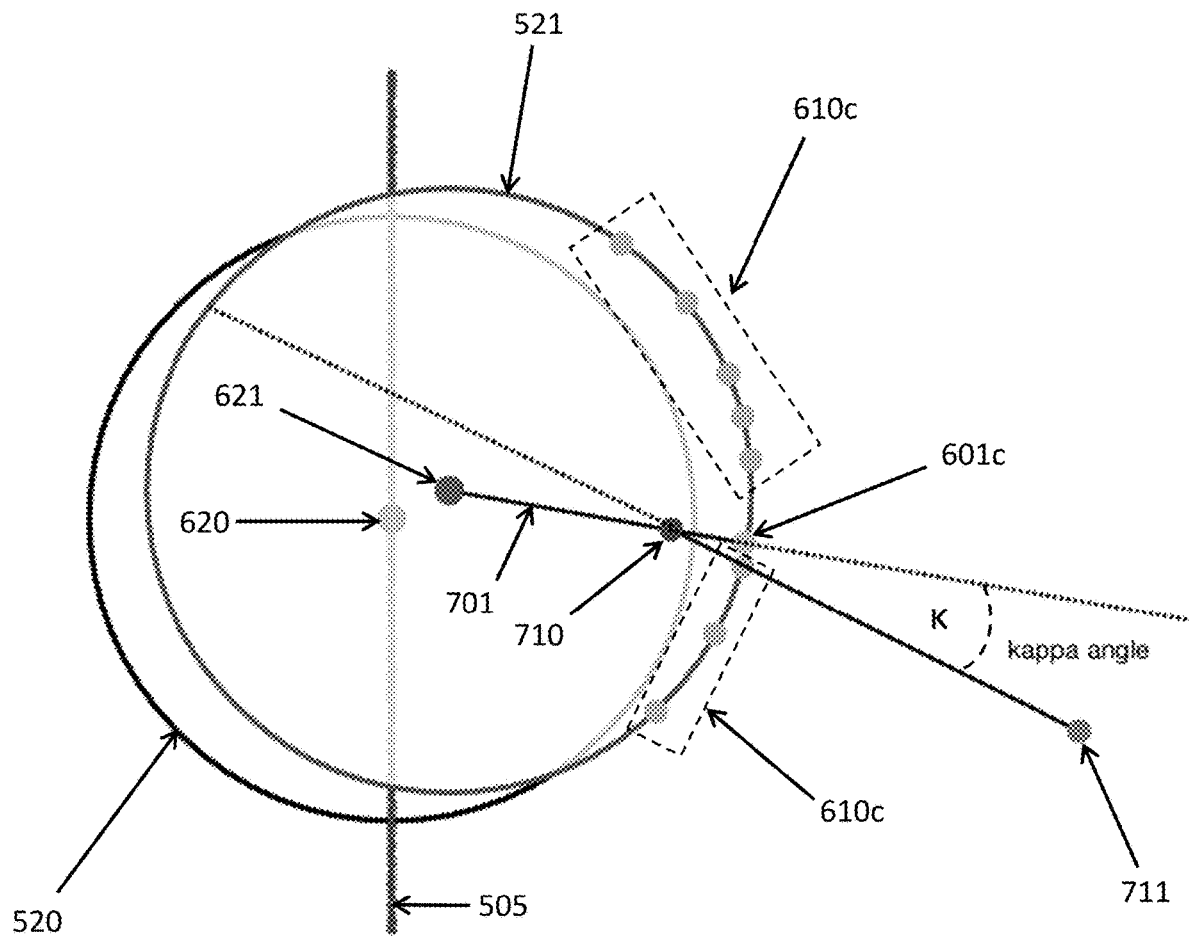

FIGS. 14-16 illustrate an example of a method for performing gaze mapping. The method may comprise locating a gaze origin 710 of the subject. The gaze origin 710 may be located at a distance from the 3D pupil center 601c along an eye axis 701. The eye axis 701 may be obtained by a projecting a vector from a center 621 of the eye of the subject to the 3D pupil center 601c, along a Z-axis of each optimal candidate eye position.

As described above, the gaze of the subject may be characterized by a vector spanning from a gaze origin of the subject to a three-dimensional location or point in space. The three-dimensional location or point in space may be a location or point on a screen of a device. The three-dimensional location or point in space may be a gaze extent of the subject. The gaze origin of the subject may be a location within an eye of the subject, which location may lie along an axis extending from a calibrated eye center of the subject to a calibrated pupil center of the subject. The calibrated pupil center may be defined by one or more calibrated 3D coordinates.

The gaze of the subject may be a vector that originates from the eye of the subject and intersects a reference plane at a reference point. The reference point may be a location in 3D space that lies on the reference plane. The reference point may be a gaze point. The reference plane may be the device screen plane. The gaze point may be a region of the subject's vision that is focused relative to other regions of the subject's vision. The area that is in focus and in full color may represent the part of the visual field that is covered by the fovea, which comprises a high density of cone cells. The area may have a slightly irregular shape that is about half a millimeter in diameter (about 1-2 visual degrees). Within the rest of the visual field (i.e., the parafoveal and peripheral areas), the image perceived by the subject may become more blurry and thus harder to interpret and discriminate in high detail.

The gaze vector of the subject may be a vector in 3D space that spans from a gaze origin to the gaze point. The gaze origin may be a point in the eye corresponding to a point of intersection between a pupillary axis and a line of sight. The pupillary axis may be a line perpendicular to the cornea that passes through the center of the pupil. The line of sight may be a vector defined by a line passing from the center of the pupil to the object of regard. Alternatively, the gaze origin may be a point of intersection between a pupillary axis and a visual axis. The visual axis may be defined as a line passing from the fovea through a nodal point of the eye. A nodal point of the eye may be a point of rotation and/or a center of rotation of the eye. Any eye-movement made by the subject while scanning an environment or adjusting a gaze point may produce a rotation of the visual axis about the nodal point.

The pupillary axis and the subject's line of sight may form an angle. The angle may be a kappa angle associated with each eye of the subject. In some cases, the kappa angle may refer to an angle formed between the pupillary axis of the subject and the visual axis of the subject. In some cases, the eye axis of the subject may correspond to the pupillary axis of the patient.

The method for gaze mapping may comprise locally rotating the eye axis about the gaze origin and about a Y-axis of the eye axis by the kappa angle of the subject, to define a gaze origin orientation. The gaze origin orientation may be a direction and/or an orientation of a vector that coincides with the line of sight of the subject or the visual axis of the subject.

FIG. 16 illustrates a rotation of the eye axis 701 about the gaze origin 710 by a kappa angle K. The gaze origin 710 may be located at a distance from the 3D pupil center 601c along the eye axis 701. As described above, the method for gaze mapping may comprise generating a gaze extent 711 for each of the subject's left and right eye. In some cases, the gaze extent 711 may correspond to a gaze vector spanning from the gaze origin 710 to a portion of the screen of the device that the subject is focused on, which gaze vector may have a direction and/or orientation corresponding to the gaze origin orientation. The gaze extent 711 may be generated by projecting a point along the gaze origin orientation by a predefined distance. The predefined distance may correspond to a distance between the gaze origin 710 of the subject and a device screen plane corresponding to a location of the screen of the device in 3D space. The predefined distance may correspond to a distance between the gaze origin 710 of the subject to a gaze point located on the device screen plane corresponding to the location of the screen of the device in 3D space. The predefined distance may be about 1 meter. In some cases, the predefined distance may be less than 1 meter. In other cases, the predefined distance may be greater than or equal to 1 meter. In some cases, the gaze extent 711 may refer to a point in 3D space that is located along the gaze vector at the predefined distance from the gaze origin 710.

The method for gaze mapping may comprise locating, in 3D space, a plane that defines a location of the screen of the device. The plane may be located based on a position of one or more portions of the device or the screen of the device, relative to a position or orientation of the subject and/or a position or orientation of the left eye or the right eye of the subject. As shown in FIGS. 8-9, the method may comprise tracing a ray 590 between the gaze origin of the subject and the gaze extent of the subject, for each of the subject's left and right eye. The method may comprise generating a first ray 590 between the gaze origin corresponding to the left eye of the subject and the gaze extent corresponding to the left eye of the subject. The method may comprise generating a second ray 590 between the gaze origin corresponding to the right eye of the subject and the gaze extent corresponding to the right eye of the subject. The method may further comprise generating or mapping a combined gaze point defined by one or more intersection points between the first ray, the second ray, and/or the device screen plane defining the location and orientation of the screen of the device, in 3D space. The intersection points may be located in 3-dimensional space. The combined gaze point may correspond to the gaze point of the subject (i.e., a point or region in space that the subject is looking at and/or focused on).

In some cases, the method may further comprise: converting the intersection points from the 3-dimensional space into relative 2-dimensional coordinates of the device screen plane. Converting the intersection points from 3D space to relative 2D coordinates may involve applying one or more projection methods. The one or more projections may comprise one or more parallel projection methods (e.g., orthographic projection, multi-view projection, axonometric projection, isometric projection, dimetric projection, trimetric projection, oblique projection, cavalier projection, cabinet projection, military projection) and/or one or more perspective projection methods. In some cases, converting the intersection points from 3D space to relative 2D coordinates may involve one or more normalization operations and/or one or more scaling operations similar to those used for mapping landmarks. In some cases, the method may comprise converting the relative 2D coordinates into a local coordinate system corresponding to the device plane, and/or converting the relative 2D coordinates into a view-based coordinate system. Converting the relative 2D coordinates into a local coordinate system or a view-based coordinate system may produce an estimation of a current gaze point of the subject.

In some cases, the method may further comprise integrating the subject's gaze position over time to determine the subject's focal point over a progression of time. In some cases, the method may further comprise determining if the subject is looking at a single position on the screen of the device (i.e., if the subject is fixated at a single position on the screen), based on changes in the subject's focal point with the progression of time. In some cases, the method may further comprise determining if the subject is looking at different positions on the screen of the device, based on changes in the subject's focal point with the progression of time. In some cases, the method may further comprise determining if the subject is looking at different positions on the screen of the device, based on the subject's smooth pursuit of and/or fixation on a feature displayed on the screen of the device.

In some cases, the method may further comprise: determining a content that is being displayed at the single position or at the different positions on the screen of the device; and evaluating the subject's interest level in the displayed content based on an amount of time that the subject spends looking the content. In other cases, the method may further comprise determining a content that is being displayed at the single position or at the different positions on the screen of the device; and evaluating the subject's interest level in the displayed content based on a pupil diameter of the subject.

The systems and methods disclosed herein may be implemented to perform gaze mapping. Gaze mapping may involve mapping a gaze of the subject to a location on a device screen in part based on one or more gaze vectors associated with at least one of the subject's left eye or right eye. In some cases, gaze mapping may involve mapping a gaze of the subject to a location on a device screen in part based on one or more gaze vectors associated with each of the subject's left eye and right eye.

In another aspect, the present disclosure provides a system for performing gaze mapping. The system may comprise one or more processors; and memory comprising machine-executable instructions that, upon execution by the one or more processors, may implement a method for performing gaze mapping for gaze tracking, the method comprising: (a) selecting an optimal candidate eye position from a plurality of candidate eye positions for each of the subject's left and right eye, wherein each candidate eye position is represented by an eye ball mesh having a different position and orientation; (b) using the optimal candidate eye positions to locate a gaze origin and generate a gaze extent for each of the subject's left and right eye; (c) locating a device screen plane that is indicative of a position of the screen of the device, using in part positional and hardware information associated with the device; and (d) mapping the gaze extent for each of the subject's left and right eye onto the device screen plane to determine the subject's gaze position. In some cases, the memory and the one or more processors may be located onboard the device. The device may or may not be a mobile device.

In another aspect, the present disclosure provides a non-transitory computer readable-medium comprising machine-executable instructions that, upon execution by one or more processors, may implement a method for performing gaze mapping. The method may comprise: (a) selecting an optimal candidate eye position from a plurality of candidate eye positions for each of a subject's left and right eye, wherein each candidate eye position is represented by an eye ball mesh having a different position and orientation; (b) using the optimal candidate eye positions to locate a gaze origin and generate a gaze extent for each of the subject's left and right eye; (c) locating a device screen plane that is indicative of a position of a screen of a device, using in part positional and hardware information associated with the device; and (d) mapping the gaze extent for each of the subject's left and right eye onto the device screen plane to determine the subject's gaze position In some cases, the systems and methods disclosed herein may be used to measure a saccade of the subject. The saccade of the subject may refer to fine pupil movements. The saccade of the subject may be determined in part based on a measurement of changes to one or more distances between a pupil location of the subject and a reference point in 3D space, over time. The changes may be measured between successive video frames. The saccade of the subject may be characterized by a saccade rate (i.e., number of saccades per second), a saccade speed or velocity (i.e., degrees per second), and/or a pupil diameter.

Computer Systems

Figure 17:
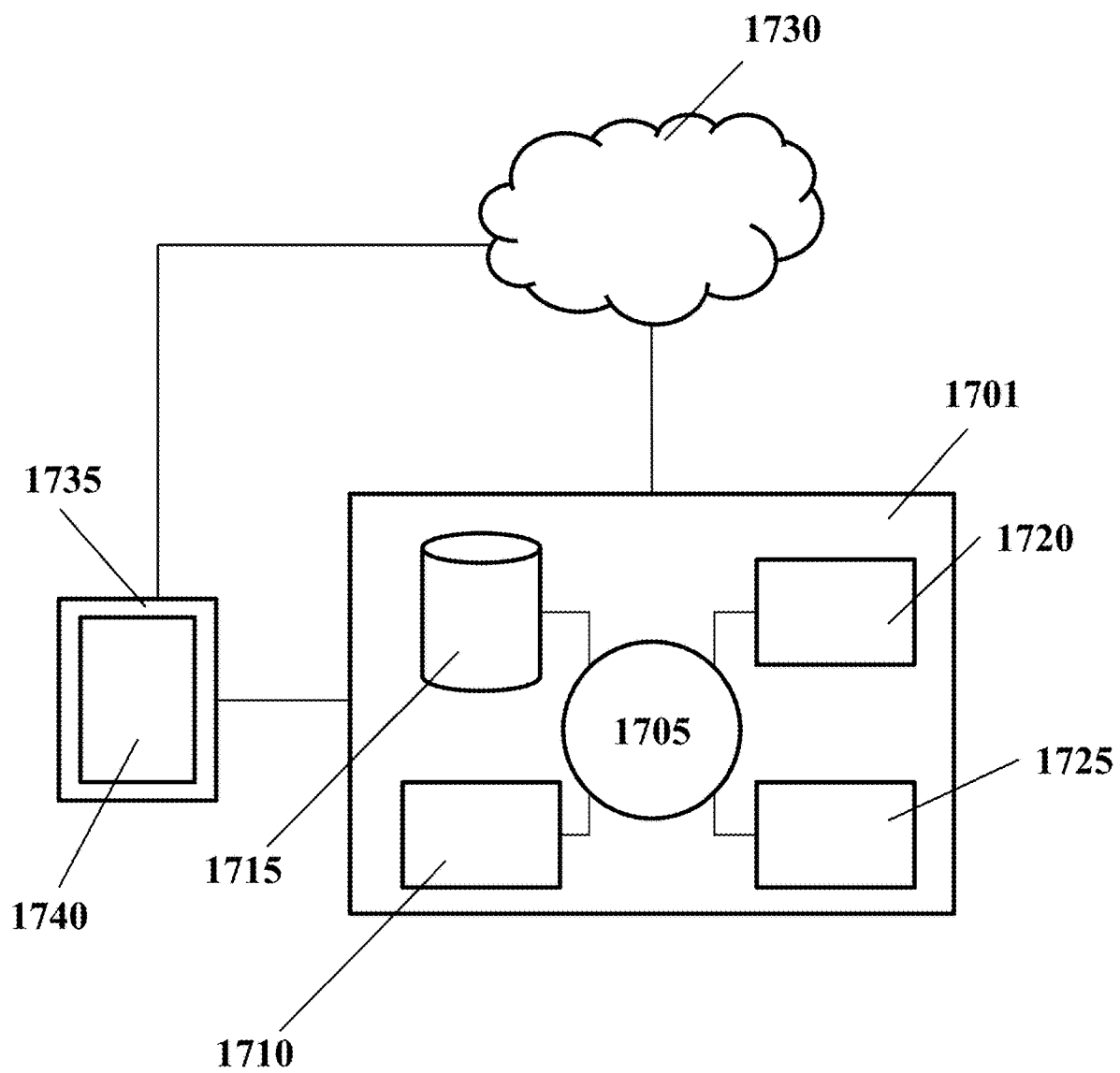
FIG. 17 schematically illustrates a computer system that is programmed or otherwise configured to implement methods provided herein.

Another aspect of the present disclosure provides computer systems that are programmed or otherwise configured to implement methods of the disclosure. FIG. 17 shows a computer system 1701 that is programmed or otherwise configured to implement a method for tracking a gaze of a subject, without requiring any prior or subsequent calibration of the subject's gaze to a predefined calibration point in space having a known location. The computer system 1701 may be configured to (a) process video data to locate, for each of the subject's left eye and right eye, an approximate eye position and orientation relative to a reference frame of the subject's face in 3-dimensional space; (b) generate a bounding box for each of the subject's left and right eye based in part on the corresponding approximate eye position and orientation; (c) apply a perspective correction to the bounding boxes and 2-dimensional images of the subject's left and right eye to create a modified image representation for each of the subject's left eye and right eye; and (d) extract a plurality of landmarks from the modified image representations of the subject's left and right eye, wherein the plurality of landmarks is used to locate an optimal eye position for each of the subject's left and right eye to enable the tracking of the subject's gaze. In some cases, the computer system 1701 may be configured to (a) obtain a plurality of landmarks from an image representation of each of a subject's left and right eye; (b) generate a plurality of candidate eye positions, wherein each candidate eye position is represented by an eye ball mesh having a different position and orientation; and (c) select an optimal candidate eye position from the plurality of candidate eye positions, based in part on a plurality of intersections between (i) a plurality of projected lines associated with the plurality of landmarks and (ii) the eye ball meshes for the plurality of candidate eye positions. In some cases, the computer system 1701 may be configured to (a) select an optimal candidate eye position from a plurality of candidate eye positions for each of a subject's left and right eye, wherein each candidate eye position is represented by an eye ball mesh having a different position and orientation; (b) use the optimal candidate eye positions to locate a gaze origin and generate a gaze extent for each of the subject's left and right eye; (c) locate a device screen plane that is indicative of a position of a screen of a device, using in part positional and hardware information associated with the device; and (d) map the gaze extent for each of the subject's left and right eye onto the device screen plane to determine the subject's gaze position. The computer system 1701 can be an electronic device of a user or a computer system that is remotely located with respect to the electronic device. The electronic device can be a mobile electronic device.

The computer system 1701 may include a central processing unit (CPU, also "processor" and "computer processor" herein) 1705, which can be a single core or multi core processor, or a plurality of processors for parallel processing. The computer system 1701 also includes memory or memory location 1710 (e.g., random-access memory, read-only memory, flash memory), electronic storage unit 1715 (e.g., hard disk), communication interface 1720 (e.g., network adapter) for communicating with one or more other systems, and peripheral devices 1725, such as cache, other memory, data storage and/or electronic display adapters. The memory 1710, storage unit 1715, interface 1720 and peripheral devices 1725 are in communication with the CPU 1705 through a communication bus (solid lines), such as a motherboard. The storage unit 1715 can be a data storage unit (or data repository) for storing data. The computer system 1701 can be operatively coupled to a computer network ("network") 1730 with the aid of the communication interface 1720. The network 1730 can be the Internet, an internet and/or extranet, or an intranet and/or extranet that is in communication with the Internet. The network 1730 in some cases is a telecommunication and/or data network. The network 1730 can include one or more computer servers, which can enable distributed computing, such as cloud computing. The network 1730, in some cases with the aid of the computer system 1701, can implement a peer-to-peer network, which may enable devices coupled to the computer system 1701 to behave as a client or a server.

The CPU 1705 can execute a sequence of machine-readable instructions, which can be embodied in a program or software. The instructions may be stored in a memory location, such as the memory 1710. The instructions can be directed to the CPU 1705, which can subsequently program or otherwise configure the CPU 1705 to implement methods of the present disclosure. Examples of operations performed by the CPU 1705 can include fetch, decode, execute, and writeback.

The CPU 1705 can be part of a circuit, such as an integrated circuit. One or more other components of the system 1701 can be included in the circuit. In some cases, the circuit is an application specific integrated circuit (ASIC).

The storage unit 1715 can store files, such as drivers, libraries and saved programs. The storage unit 1715 can store user data, e.g., user preferences and user programs. The computer system 1701 in some cases can include one or more additional data storage units that are located external to the computer system 1701 (e.g., on a remote server that is in communication with the computer system 1701 through an intranet or the Internet).

The computer system 1701 can communicate with one or more remote computer systems through the network 1730. For instance, the computer system 1701 can communicate with a remote computer system of a user (e.g., a subject, an end user, a consumer, a stakeholder, a content provider, a healthcare provider, a parent or guardian, an academic institution, a teacher, etc.). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1701 via the network 1730.

Methods as described herein can be implemented by way of machine (e.g., computer processor) executable code stored on an electronic storage location of the computer system 1701, such as, for example, on the memory 1710 or electronic storage unit 1715. The machine executable or machine readable code can be provided in the form of software. During use, the code can be executed by the processor 1705. In some cases, the code can be retrieved from the storage unit 1715 and stored on the memory 1710 for ready access by the processor 1705. In some situations, the electronic storage unit 1715 can be precluded, and machine-executable instructions are stored on memory 1710.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 1701, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media including, for example, optical or magnetic disks, or any storage devices in any computer(s) or the like, may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1701 can include or be in communication with an electronic display 1735 that comprises a user interface (UI) 1740 for providing, for example, a portal for monitoring or tracking a movement of a gaze of the subject. In some cases, the portal may be used to render, view, monitor, and/or manipulate one or more eye ball mesh models generated by the gaze tracking system. The portal may be provided through an application programming interface (API). A user or entity can also interact with various elements in the portal via the UI. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1705. The algorithm may be configured to (a) process video data to locate, for each of the subject's left eye and right eye, an approximate eye position and orientation relative to a reference frame of the subject's face in 3-dimensional space; (b) generate a bounding box for each of the subject's left and right eye based in part on the corresponding approximate eye position and orientation; (c) apply a perspective correction to the bounding boxes and 2-dimensional images of the subject's left and right eye to create a modified image representation for each of the subject's left eye and right eye; and (d) extract a plurality of landmarks from the modified image representations of the subject's left and right eye, wherein the plurality of landmarks is used to locate an optimal eye position for each of the subject's left and right eye to enable the tracking of the subject's gaze. In some cases, the algorithm may be configured to (a) obtain a plurality of landmarks from an image representation of each of a subject's left and right eye; (b) generate a plurality of candidate eye positions, wherein each candidate eye position is represented by an eye ball mesh having a different position and orientation; and (c) select an optimal candidate eye position from the plurality of candidate eye positions, based in part on a plurality of intersections between (i) a plurality of projected lines associated with the plurality of landmarks and (ii) the eye ball meshes for the plurality of candidate eye positions. In some cases, the algorithm may be configured to (a) select an optimal candidate eye position from a plurality of candidate eye positions for each of a subject's left and right eye, wherein each candidate eye position is represented by an eye ball mesh having a different position and orientation; (b) use the optimal candidate eye positions to locate a gaze origin and generate a gaze extent for each of the subject's left and right eye; (c) locate a device screen plane that is indicative of a position of a screen of a device, using in part positional and hardware information associated with the device; and (d) map the gaze extent for each of the subject's left and right eye onto the device screen plane to determine the subject's gaze position.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for gaze tracking, comprising:
   collecting video data of a subject's face using a plurality of sensors on a device, the plurality of sensors comprising an image sensor and a depth sensor, wherein the video data comprises a plurality of images containing depth information; and
   processing the video data to track the subject's gaze, without requiring any prior or subsequent calibration of the subject's gaze to a predefined calibration point in space having a known location, wherein processing the video data to track the subject's gaze comprises (a) obtaining a plurality of landmarks from and located within an image representation of at least one of the subject's left eye or right eye, and (b) generating a plurality of candidate eye positions, wherein each candidate eye position is represented by an eye ball mesh having a different position and orientation.

2. The method of claim 1, wherein the video data comprises RGB-D video.

3. The method of claim 1, wherein the subject's gaze is tracked to an accuracy within about 0.1 degrees to about 2.0 degrees and a precision within about 0.5 degrees to about 10 degrees.

4. The method of claim 1, wherein the subject's gaze is tracked substantially in real time as the video data is being collected using the plurality of sensors on the device.

5. The method of claim 1, wherein processing the video data to track the subject's gaze further comprises:

(c) selecting an optimal candidate eye position from the plurality of candidate eye positions, based in part on a plurality of intersections between (i) a plurality of projected lines associated with the plurality of landmarks and (ii) the eye ball meshes for the plurality of candidate eye positions.

6. The method of claim 5, wherein the plurality of landmarks is projected along a normal of a bounding box for each of the subject's left and right eye.

7. The method of claim 5, wherein the position and orientation of each eye ball mesh is defined relative to an approximate eye reference position for each candidate eye position.

8. The method of claim 7, wherein the position of each eye ball mesh comprises a relative translation to the approximate eye reference position for each candidate eye position.

9. The method of claim 7, wherein the orientation of each eye ball mesh comprises a relative rotation to the approximate eye reference position for each candidate eye position.

10. The method of claim 7, wherein the plurality of projected lines extends from an origin point in the approximate eye reference position to the plurality of landmarks located in 3-dimensional space.

11. The method of claim 5, wherein the plurality of intersections is distributed on surfaces of the eye ball meshes.

12. The method of claim 5, wherein the plurality of intersections comprises a set of intersections associated with each of the plurality of candidate eye positions.

13. The method of claim 12, further comprising:
calculating a distance between a boundary point and a pupil center point, for each set of intersections associated with each candidate eye position, to generate a list of radial distances, wherein the boundary point comprises at least one of a pupil boundary point or an iris boundary point.

14. The method of claim 13, further comprising:
calculating a coefficient of variation for the list of radial distances; and
selecting the optimal candidate eye position by comparing the coefficient of variation for the list of radial distances across the plurality of candidate eye positions.

15. The method of claim 5, wherein the steps of (a)-(c) are performed on a video frame selected from the video data.

16. The method of claim 1, wherein the image sensor and the depth sensor are implemented using an RGB-D camera on the device.

17. The method of claim 1, wherein the image sensor comprises a front-facing camera and the depth sensor comprises an infrared (IR) sensor.

18. The method of claim 15, wherein the video frame comprises RGB and RGB-D information.

19. The method of claim 5, further comprising:
repeating steps (a)-(c) on each new video frame comprising new information.

20. The method of claim 19, wherein steps (a)-(c) are repeated substantially in real time as each new video frame is received.

21. The method of claim 1, wherein the eye ball mesh is spherical in shape.

22. The method of claim 1, wherein the eye ball mesh is non-spherical in shape.

23. The method of claim 1, wherein the eye ball mesh is generated in part based on an intersection or a union of two or more spheres or ellipsoids.

24. The method of claim 1, wherein the plurality of landmarks are located within one or more bounding boxes generated for the image representation of at least one of the subject's left eye or right eye.

25. The method of claim 24, wherein the one or more bounding boxes comprise a left bounding box corresponding to an approximate eye position and orientation of the subject's left eye and a right bounding box corresponding to an approximate eye position and orientation of the subject's right eye.

26. The method of claim 1, wherein the plurality of landmarks comprise a plurality of point estimates within the image representation of at least one of the subject's left eye or right eye.

27. The method of claim 26, wherein the plurality of point estimates comprise at least one center point estimate corresponding to a pupil center for the subject's left or right eye and a plurality of circumferential point estimates surrounding the pupil center for the subject's left or right eye.

28. The method of claim 1, wherein the eye ball mesh is a partial eye ball mesh.

* * * * *